US012546166B2

(12) United States Patent
Ruffinengo et al.

(10) Patent No.: US 12,546,166 B2
(45) Date of Patent: Feb. 10, 2026

(54) LADDER TROLLEY AND RELATED METHOD

(71) Applicant: M.U.L.E. Inc., Dartmouth (CA)

(72) Inventors: Bruno Ruffinengo, Dartmouth (CA); Michael Dennis MacDonald, Dartmouth (CA)

(73) Assignee: M.U.L.E. Inc.

(*) Notice: Subject to any disclaimer, the term of this patent is extended or adjusted under 35 U.S.C. 154(b) by 21 days.

(21) Appl. No.: 18/609,044

(22) Filed: Mar. 19, 2024

(65) Prior Publication Data

US 2025/0297518 A1 Sep. 25, 2025

(51) Int. Cl.
*E06C 7/12* (2006.01)

(52) U.S. Cl.
CPC .................................... *E06C 7/12* (2013.01)

(58) Field of Classification Search
CPC ... E06C 7/12; E06C 7/16; B66B 9/193; B66B 9/16
See application file for complete search history.

(56) References Cited

U.S. PATENT DOCUMENTS 3,115,211 A 12/1963 Ostrander, Jr.
3,666,054 A 5/1972 Ellings et al.
3,891,062 A * 6/1975 Geneste .................... B66B 9/16 182/103
4,183,423 A * 1/1980 Lewis ....................... B66B 9/16 187/244
6,244,381 B1 * 6/2001 Ruble ....................... E06C 7/12 182/103
7,424,932 B1 * 9/2008 Murphy .................. E06C 1/345 182/103
9,856,697 B2 1/2018 Reyes
9,944,495 B2 * 4/2018 Webber ................... B66B 9/193
11,505,226 B1 11/2022 Taranto
(Continued)

FOREIGN PATENT DOCUMENTS

DE 102007007052 A1 8/2008
EP 1829763 A2 9/2007
(Continued)

OTHER PUBLICATIONS

Machine Translation of WO 9732106 A (Holzinger) (Year: 1997).*
(Continued)

*Primary Examiner* — Minh Truong
*Assistant Examiner* — Michelle M Mudwilder
(74) *Attorney, Agent, or Firm* — Brown & Michaels, PC

(57) ABSTRACT

A ladder trolley includes a trolley frame having an upper end longitudinally spaced apart from a lower end. The trolley frame has longitudinally extending laterally spaced apart first and second side flanges; webbing connecting the first and second side flanges; and a ladder travel channel extending from the upper end to the lower end. The channel is defined by at least the first and second side flanges and the webbing and is open at the upper and lower ends. The ladder trolley includes at least one pair of ladder side rollers moveably connected to the trolley frame. Each pair of ladder side rollers has first and second ladder side rollers being laterally moveable and resiliently biased laterally into the channel. The ladder trolley includes a payload support connected to the trolley frame exterior to the ladder travel channel.

11 Claims, 15 Drawing Sheets

(56) References Cited

U.S. PATENT DOCUMENTS

| | | | | |
|---|---|---|---|---|
| 2014/0246271 A1* | 9/2014 | Davies | E06C 7/48 182/103 |
| 2015/0300090 A1* | 10/2015 | Strand | E06C 7/12 182/103 |
| 2016/0201391 A1 | 7/2016 | West et al. | |
| 2019/0233266 A1* | 8/2019 | Delaney | E06C 1/38 |
| 2020/0102789 A1 | 4/2020 | Young | |
| 2022/0397002 A1 | 12/2022 | Brus | |
| 2023/0279725 A1* | 9/2023 | Ingraffia | E06C 7/14 248/238 |

FOREIGN PATENT DOCUMENTS

| | | | |
|---|---|---|---|
| FR | 2463090 A1 * | 2/1981 | |
| FR | 2504508 A1 * | 10/1982 | |
| WO | WO-9732106 A1 * | 9/1997 | B66B 9/193 |

OTHER PUBLICATIONS

Solmetric website, accessed Mar. 20, 2024 <https://www.solmetric.com/product/module-lift/>.
Grizzly Equipment, 598 000 Ladder Wheel, Grizzly website, accessed Oct. 10, 2021 <https://www.grizzlyequip.com/product/267-ladder-wheel.html>.
Roofing Direct website, accessed Mar. 15, 2024 <https://www.roofingdirect.com/shop/roof-zone-long-handle-hoisting-wheel/>.
Tie Down website, accessed Mar. 15, 2024 <https://www.tiedown.com/>.
Solmetric, Module Lift Instructions brochure, website <<www.solmetric.com>>.
Solmetric, Ladder Compatibility brochure, website <<www.solmetric.com>>.
Grizzly Equipment, 598 000 Ladder Wheel Drawing, dated Mar. 15, 2001.
TranzVolt UnPacking, Roofing Carriage Box/Roofing Platform Box/Solar Panel Platform Box, #08317 (E1657 Rev. Feb. 21, 2020).
TranzVolt Installation and Operations Manual, Instruction #08315 (E1646, Rev. Apr. 2, 2020), Tie Down Manufacturing Ingenuity, Atlanta, GA.
TranzVolt Lift Hoist brochure, Battery Powered Remote Controlled Lift Hoist, Tie Down Manufacturing Ingenuity, Atlanta, GA.
Tranzsporter, Part Manual for TP250, TP400 Track Sections & Engines, Instructions #08256 (e1417—Rev. Aug. 31, 21), Tie Down Manufacturing Ingenuity, Atlanta, GA.
Tranzsporter, TP250 Platform Hoist, Tie Down Manufacturing Ingenuity, Atlanta, GA.
Safety Hoist Company, The Hoist Standoff, Assembly Instructions, Exton, PA.
Safety Hoist Co., New Safety Hoist Solar Panel Cradle flyer, Exton, PA.
Safety Hoist Co., Why choose Safety Hoist Brochure, Exton, PA.
Safety Hoist, Operation Manual Electric Wire Rope Hoist, pp. 1-30, Exton, PA.
Safety Hoist Co., Operating & Instruction Manual, pp. 1-11, Exton, PA.
Safety Hoist Co., Operator's Manual, EH-500 Electric Material Hoist, pp. 1-22, Exton, PA.
Safety Hoist Co., Operator's Manual, EH-500 Electric Material Hoist, List of Components, pp. 1-2, Exton, PA.
Safety Hoist Co., Operator's Manual, EH-250 Electric Material Hoist, pp. 1-18, Exton, PA.
Safety Hoist Co., Operator's Manual, EH-250 Electric Material Hoist, List of Components, pp. 1-2, Exton, PA.
Safety Hoist Co., Operator's Manual, EH-250 Electric Material Hoist, List of Parts, pp. 1-2, Exton, PA.
Reimann & Georger Corp., Pro400 Platform Hoist Instructions, P/N 6102078, Sep. 17, 2013, pp. 1-20, Buffalo, NY.
Reimann & Georger Corp., Pro225 Platform Hoist Instructions, Jul. 30, 2013, pp. 1-18, Buffalo, NY.
Reimann & Georger Corp., Hoisting Equipment 2022, pp. 1-7, Buffalo, NY.
Materials Handling, Solarlift Brochure, <www.materialshandling.com.au>, Australia.
Materials Handling, Construction Ladder Lift Brochure, <www.materialshandling.com.au>, Australia.
Haemmerlin, Equipments Metriers, CDH-H 01.21.
Haemmerlin, Product sheet—Hoist, Maxial Excellium 200/30 Roofer 10, 50 m, Sheet MM400, <www.haemmerlin.com>, France.
Grizzly, Operator's Instruction Manual, Model 511 000 / 512 000, pp. 1-15, <www.alcor-inc.com>, Alcor, Quebec, Canada.
Grizzly, Equipment, 512 000 400 Lbs Ladder Hoist data sheet, pp. 1-2, Canada.
Grizzly, 400 Ladder Hoist blow out, 512000, dated Apr. 10, 1999, revised 06.01.2007.
Grizzly, Equipment, 511 000 250 Lbs Ladder Hoist data sheet, pp. 1-2, Canada.
Grizzly, Product Catalogue, 512 000 400 Lbs Ladder Hoist data sheet, pp. 16-19 and 24, <www.alcor-inc.com>, Alcor, Quebec, Canada.
EZ AC Lift website, accessed Mar. 20, 2024 <https://ez-aclift.com/>.
YouTube website, Simple DIY Ladder Lift Asphalt Shingles on the Roof, accessed Mar. 20, 2024, <https://www.youtube.com/watch?v=5SzPJQvijTE>.
YouTube website, Homemade Ladder Hoist, accessed Mar. 20, 2024 <https://www.youtube.com/watch?v=t0BGMflfMcc>.
YouTube website, Build your own ladder hoist with 24'/32' ladder and 800lb hoist/lifter, accessed Mar. 20, 2024 <https://www.youtube.com/watch?v=lcKTDvsxg_U>.
YouTube website, Building a DIY Ladder Hoist using a Harbor Freight 'Badland' Winch. The Knee Saved 5000!!!, accessed Mar. 20, 2024 <https://www.youtube.com/watch?v=W6NSxugVrGo>.
YouTube website, DIY ladder hoist, accessed Mar. 20, 2024 <https://www.youtube.com/watch?v=92_rjr3wg2Q>.
YouTube website, Ladder Hoist Build and Cost, accessed Mar. 20, 2024 <https://www.youtube.com/watch?v=5SGR9VShNg0>.
YouTube website, Ladder Hoist / Ladder lift for Solar Panels with 2 story house, accessed Mar. 20, 2024 <https://www.youtube.com/watch?v=DGF0HWp2eao>.
The Journal of Light Construction website, Three Simple Home-Made Hoists, Home built roofing shingle lift, accessed Mar. 20, 2024 <https://www.jlconline.com/tools/trucks-equipment/three-simple-home-made-hoists_o>.
The Journal of Light Construction website, Gravity Powered Shingle Shuttle-One Man, Home built roofing shingle lift, accessed Mar. 20, 2024 <https://www.jlconline.com/tools/trucks-equipment/three-simple-home-made-hoists_o>.
The Journal of Light Construction website, Gravity Powered Shingle Shuttle-Construction, Home built roofing shingle lift, accessed Mar. 20, 2024 <https://www.jlconline.com/tools/trucks-equipment/three-simple-home-made-hoists_o>.
The Journal of Light Construction website, My Home Made Shingle Roof Hoist, Home built roofing shingle lift, accessed Mar. 20, 2024 <https://www.jlconline.com/tools/trucks-equipment/three-simple-home-made-hoists_o>.
Tie Down website, Roofing, accessed Mar. 20, 2024 <https://www.tiedown.com/category/roofing/>.
YouTube website, Tie Down, accessed Mar. 20, 2024 <https://www.youtube.com/@TieDownEngineering/videos>.
RGC Hoisting website, accessed Mar. 20, 2024 <https://rgchoisting.com/platform-hoists/>.
Materials Handling website, Ladder Lifters—Solar and Construction, accessed Mar. 20, 2024 <https://www.materialshandling.com.au/products/mathand-solar-construction-ladder-lifters/>.
Camac website, Construction lifting systems, accessed Mar. 20, 2024 <https://www.camacsa.com/en/15-solar-lift.html>.
CEM website, CEM Ladder Lift, accessed Mar. 20, 2024 <https://www.cemladderlift.com/en/>.
Nolves website, Modulater ladder lift for construction. accessed Mar. 20, 2024 <https://www.nolves.com/scala-montacarichi-componibile-per-edilizia/>.

(56) References Cited

OTHER PUBLICATIONS

Manutan website, Ladder lift Maxial Excellium 200/30—For roofers, accessed Mar. 20, 2024 <https://www.manutan.it/it/mai/scala-montacarichi-maxial-excellium-200-30-per-conciatetti>.
Tutto Cantiere website, Lift 2000 ladder material lifter, accessed Mar. 20, 2024 <https://tuttocantiereonline.com/elevatore-a-motore-con-scala-sollevare-materiali-per-traslochi-pannelli-solari-materiali-tegole>.
Scale Reale website, MobiLift with Swivel—from 2.5 to 20.75 metrs / capacity 100-250 kg, accessed Mar. 20, 2024 <https://www.scalareale.it/a170s.html>.
Haemmerlin website, Search results for: max, accessed Mar. 20, 2024 <https://www.haemmerlin.com/?s=maxial>.
Loose photos retrieved prior to Mar. 20, 2024.

* cited by examiner

LADDER TROLLEY AND RELATED METHOD

FIELD

This application relates generally to the field of ladder lift systems and methods of use thereof.

INTRODUCTION

Within various industries, it is often necessary to vertically transport payloads to upper levels, such as roofs. In the construction industry, for example, the payloads can be bulky, heavy construction materials, such as panels, shingles, framing members, and the like. Traditionally, vertically transporting a payload required physically carrying the payload up a ladder or stairs, or the use of large, heavy machinery to raise the payload to the desired level. Ladder lift systems are systems that enable vertical transportation of a payload through lifting the payload up a ladder via the ladder lift.

DRAWINGS

SUMMARY

Figure 1:
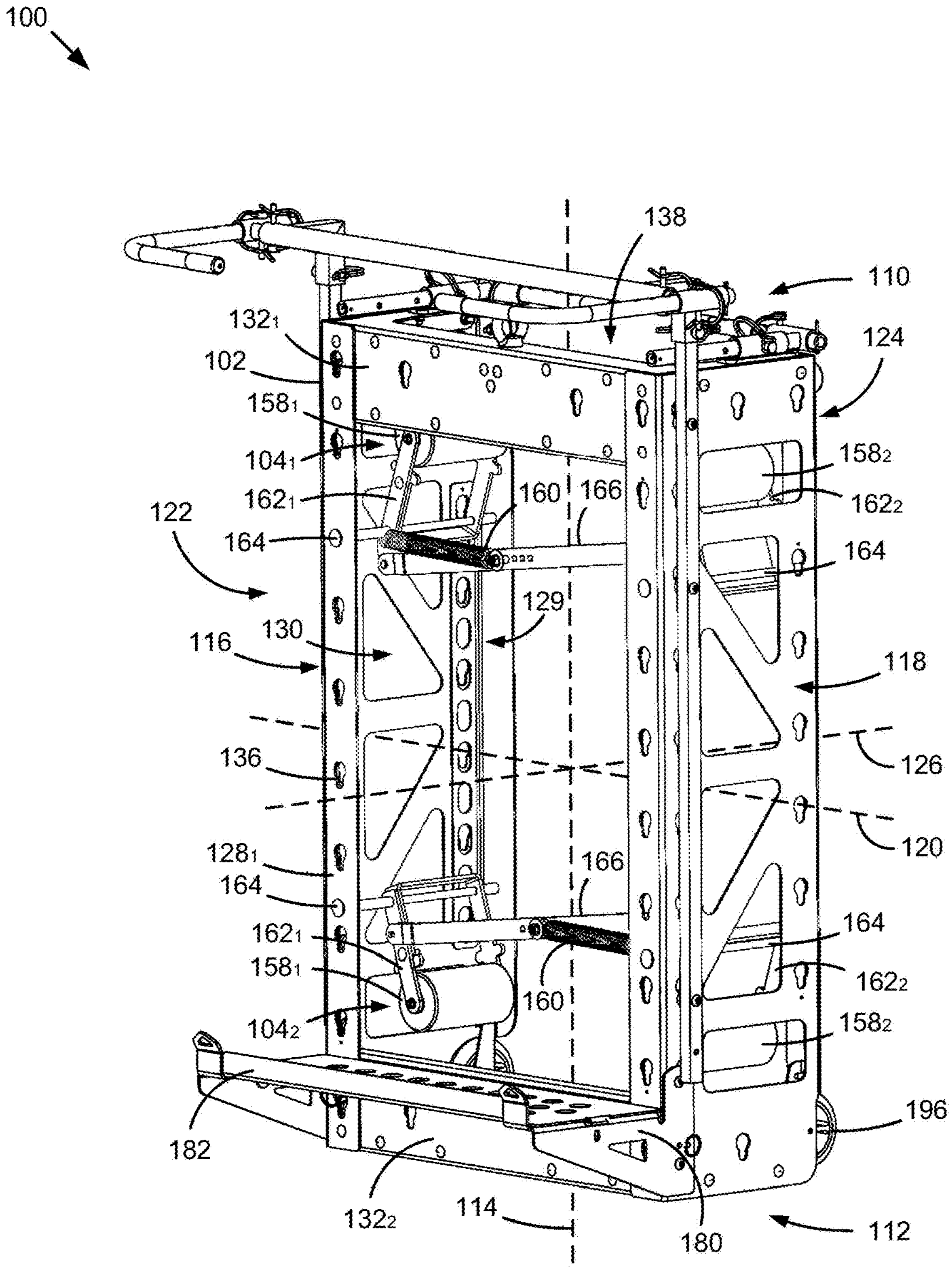
FIG. 1 is a front perspective view of an example ladder trolley, in accordance with an embodiment.

In accordance with one aspect of this disclosure, a ladder trolley includes a trolley frame having an upper end longitudinally spaced apart from a lower end. The trolley frame has longitudinally extending first and second side flanges, the first side flange being laterally spaced apart from the second side flange; webbing connecting the first and second side flanges; and a ladder travel channel extending from the upper end to the lower end. The ladder travel channel is defined by at least the first side flange, the second side flange, and the webbing, and the ladder travel channel is open at the upper and lower ends. The ladder trolley further includes at least one pair of ladder side rollers moveably connected to the trolley frame. Each pair of ladder side rollers has a first ladder side roller and a second ladder side roller, the first and second ladder side rollers being laterally moveable and resiliently biased laterally into the channel. The ladder trolley further includes a payload support connected to the trolley frame, the payload support exterior to the ladder travel channel.

In accordance with one aspect of this disclosure, a method of lifting a payload up a ladder includes placing a payload onto a payload shelf of a ladder trolley; positioning the ladder trolley around a ladder having a first longitudinally extending ladder rail and a second longitudinally extending ladder rail; and engaging the ladder with at least one pair of laterally opposed ladder side rollers of the ladder trolley. Engaging the ladder with each pair of ladder side rollers includes laterally resiliently biasing a first ladder side roller from the ladder trolley into contact with the first ladder rail and laterally resiliently biasing a second ladder side roller from the ladder trolley into contact with the second ladder rail.

These and other aspects and features of various embodiments will be discussed in greater detail below.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

As used herein and in the claims, a group of elements are said to 'collectively' perform an act where that act is performed by any one of the elements in the group, or performed cooperatively by two or more (or all) elements in the group.

Some elements herein may be identified by a part number, which is composed of a base number followed by an alphabetical or subscript-numerical suffix (e.g. 112*a*, or $\mathbf{112}_1$). Multiple elements herein may be identified by part numbers that share a base number in common and that differ by their suffixes (e.g. $\mathbf{112}_1$, $\mathbf{112}_2$, and $\mathbf{112}_3$). All elements with a common base number may be referred to collectively or generically using the base number without a suffix (e.g. 112).

Vertical transportation of payloads presents numerous problems. For example, physically carrying a payload such as up a ladder or stairs can be a time-consuming, labor-intensive task, which can risk physical injury to those carrying the payload, those below, and to the payload itself. These issues are magnified where multiple payloads and/or bulkier payloads are to be transported. The use of machinery such as, for example, cranes, hoists, telescopic handlers, and aerial work platforms as an alternative means of vertical transportation can present its own unique problems. For example, these machines can be costly, time-consuming to set up, can face scheduling issues, and can face accessibility issues in reaching the location of the payload (e.g., difficult terrain, confined spaces, overhead power lines, inside buildings, etc.). 'Ladder hoists' (sometimes called 'hoist ladders') enable vertical transportation of a payload through lifting the payload up a custom-built track via a moving payload platform. However, such custom-built tracks are for material lifting only and are made up of high-weight, individual rigid spans that must be fastened together to achieve the desired height. Accordingly, such custom-built tracks require significant set-up and take-down times, and are cumbersome for storing, transport, and deployment.

To address these problems, ladder lift systems enable vertical transportation of a payload through lifting the payload up a ladder via the ladder lift. However, where the payload is irregularly shaped, has an imbalanced load, and/or is positioned off-center on the ladder lift, the uneven weight distribution can cause the ladder lift to tilt on the ladder. This can lead to a portion of the ladder lift, which is not intended to engage the ladder, dragging along the ladder, thereby increasing the work required to lift the ladder lift and potentially damaging the ladder and the ladder lift. Due to the ladder lift tilting and/or vibrating when dragging along the ladder, the payload can be encouraged to shift on the ladder lift, exacerbating the uneven weight distribution. This can establish a feedback loop in which further shifting the center of gravity of the payload leads to further tilting of the ladder lift and/or higher frictional resistance to lifting, thereby leading to further shifting, and so on. This can ultimately lead to the payload shifting far enough to fall off the ladder lift, risking injury to those below and damage to the payload. Such payload issues also increase the dangers of the ladder itself shifting, slipping, or completely falling.

Figure 14:
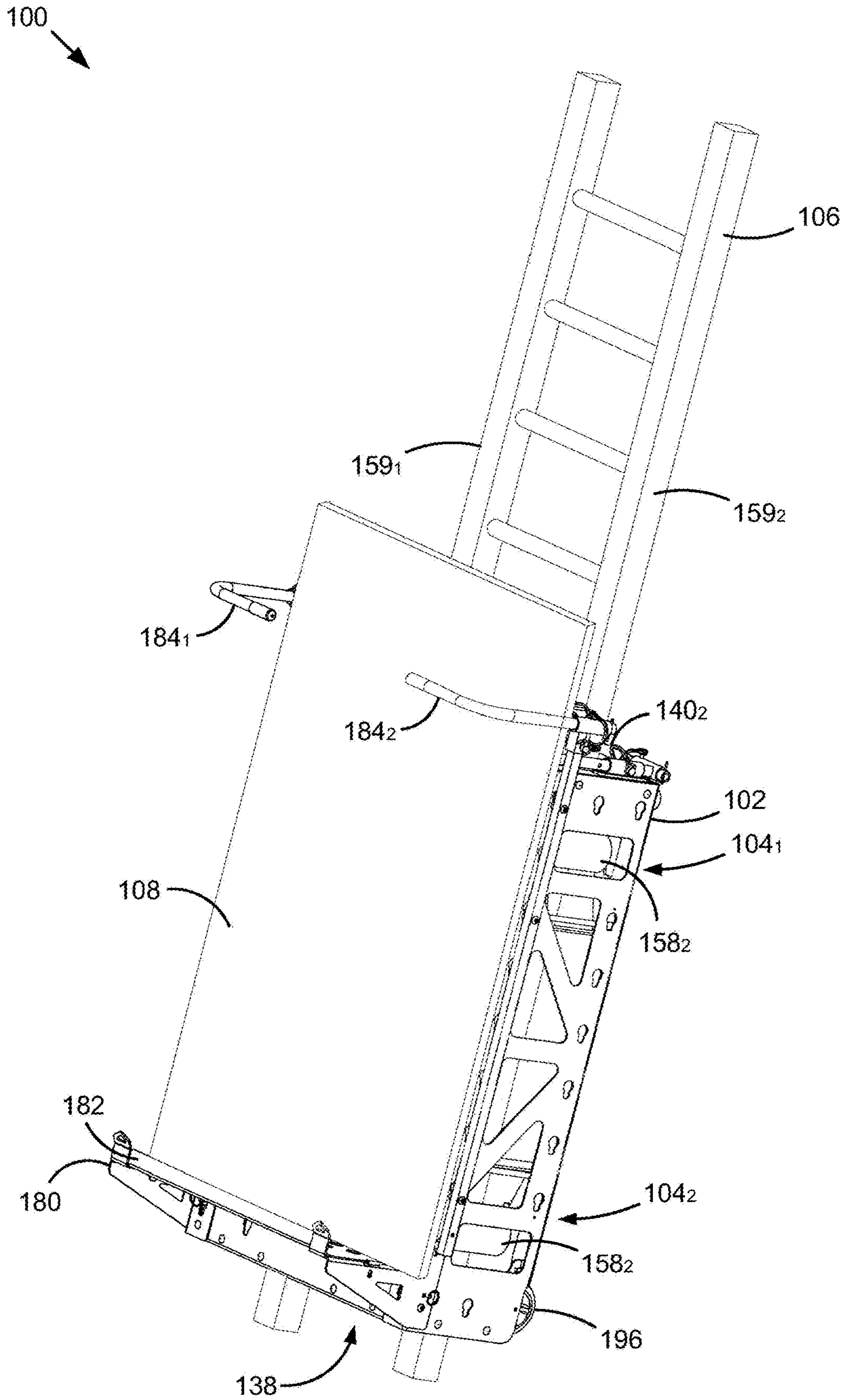
FIG. 14 is a front perspective view of the ladder trolley of FIG. 1 secured to the ladder and with a payload secured to the ladder trolley.

Disclosed herein is a ladder trolley, generally referred to as ladder trolley 100, which addresses each of the foregoing problems. Referring to FIGS. 1 and 14, in the illustrated example, the ladder trolley 100 includes a trolley frame 102 and a plurality of pairs of opposed ladder side rollers 104. In use, the trolley frame 102 is positionable around a ladder 106 and can be hoisted up the ladder 106 while carrying a payload 108 such as, for example, construction materials, including drywall, wood panels, shingles, solar panels, framing members, and the like. As shown, the opposed pairs of ladder side rollers 104 are resiliently biased inwardly from the trolley frame 102 into engagement with the ladder 106. The pairs of opposed ladder side rollers 104 encourage the trolley frame 102 to maintain an orientation relative to the ladder 106. That is, the pairs of ladder side rollers 104 collectively generate a biasing force that biases the trolley frame 102 to remain generally aligned with the ladder 106 when carrying the payload 108. Accordingly, the biasing force collectively generated by the pairs of ladder side rollers 104 may resist tilting of the trolley frame 102 as a result of an irregularly shaped, imbalanced, and/or off-center payload 108 (i.e., may automatically counteract heading and width deltas, resulting in anti-yaw and anti-sway corrections), which may thereby obviate the above-described problems encountered in vertically transporting a payload.

It will be appreciated that the ladder trolley 100 may be used with any suitable ladder, including standard straight ladders, extension ladders, and the like. Further, while referred to herein as a "ladder" trolley, the use of which is described/exemplified with a traditional ladder, it will be appreciated that the ladder trolley 100 may also be used with any other type of "ladder" suitable for guiding vertical transport of the ladder trolley 102. For example, the ladder used with the ladder trolley 100 may be a ramp, a runway, a track, a pair of spaced apart rails, and the like, dimensioned such that the trolley frame 102 can be positioned around the transport guide and the ladder side rollers 104 can be engaged with the transport guide.

Referring to FIGS. 1 to 6, in the illustrated example, the trolley frame 102 has an upper end 110 and a lower end 112. As shown, the upper end 110 is longitudinally spaced apart from the lower end 112. That is, the trolley frame 102 has a longitudinal axis 114 (which, when the lower end 112 of the trolley frame 102 is positioned on a horizontal surface, extends vertically) and the upper end 110 and lower end 112 are spaced apart in the direction defined by the longitudinal axis 114, referred to herein as the longitudinal direction. The longitudinal direction may be understood as extending in an upward direction and a downward direction, where the upward direction is the direction moving from the lower end 112 toward the upper end 110, and the downward direction is the direction moving from the upper end 110 toward the lower end 112.

The trolley frame 102 further has a first side 116 and a second side 118. As shown, the first side 116 is laterally spaced apart from the second side 118. That is, the trolley frame 102 has a lateral axis 120 (which, when the lower end 112 of the trolley frame 102 is positioned on a horizontal surface, extends horizontally) that is transverse to the longitudinal axis 114, and the first side 116 and the second side 118 are spaced apart in the direction defined by the lateral axis 120, referred to herein as the lateral direction.

The trolley frame 102 further has a front side 122 and a back side 124. As shown, the trolley frame 102 has a depth axis 126 (which, when the lower end 112 of the trolley frame 102 is positioned on a horizontal surface, extends horizontally) that is transverse to both the longitudinal axis 114 and the lateral axis 120, and the front side 122 and the back side 124 are spaced apart in the direction defined by the depth axis 126, referred to herein as the depth direction. The depth direction may be understood as extending in a forward direction and a rearward direction, where the forward direction is the direction moving from the back side 124 toward the front side 122, and the rearward direction is the direction moving from the front side 122 toward the back side 124.

Referring still to FIGS. 1 to 6, in the illustrated example, the trolley frame 102 includes longitudinally extending first and second side flanges 128 (i.e., extending in length in the longitudinal direction). As shown, the first side flange $128_1$ is laterally spaced apart from the second side flange $128_2$ (i.e., spaced apart in the lateral direction). The first and second side flanges 128 also extend from the front side 122 to the back side 124 of the trolley frame 102 (i.e., extend in the depth direction). In this way, the first and second side flanges 128 respectively define the first and second sides 116, 118 of the trolley frame 102.

The first and second side flanges 128 can be any linear framing members made of any material suitable for providing sufficient structural strength and rigidity for the trolley frame 102 to retain its general shape against the biasing force generated by the pairs of ladder side rollers 104 pressing against the ladder 106. That is, as described in greater detail subsequently, when the pair(s) of opposed ladder side rollers 104 are resiliently biased inwardly from the trolley frame 102 into engagement with the ladder 106, the ladder 106 is effectively held in compression between each pair of ladder side rollers 104 (see e.g., FIG. 10). As such, an equal and opposite force will be experienced by the trolley frame 102. The first and second side flanges 128 can therefore be any suitable type and material capable of retaining the general shape of the trolley frame 102 against this force. For example, framing members used for the first and second side flanges 128 can be flat, "I"-shape, "C"-shape, "L"-shape, or any other suitable shape. The first and second side flanges 128 can be made of, for example, steel, aluminum, titanium, magnesium, fiber composites, or any other suitable material.

In the illustrated example, the first and second side flanges 128 are C-channels. An advantage of using C-channels is that it provides three generally flat surfaces, which may permit ease of connectivity with other components of the ladder trolley 100. This may thereby save assembly time, cost, and reduce the final weight of the ladder trolley 100. Another advantage is that, as described in greater detail subsequently, the pairs of ladder side rollers 104 can nest or partially-nest within a flange channel 129 defined by the three flat surfaces of the first and second side flanges 128. This may enable use with a wider range of ladder sizes and may also improve ease of positioning the trolley frame 102 around the ladder 106 by moving the ladder side rollers 104 into the flange channels 129 to provide an unobstructed path for the ladder 106.

In the illustrated example, the first and second side flanges 128 are made of aluminum. Advantages of aluminum include that it is a lightweight material, resistant to corrosion (i.e., suitable for use in a range of environmental conditions), and low cost. However, any other suitable material providing any of these or other advantages known in the material science art may be used, such as steel, carbon fiber, or fiberglass, for example. Additionally, in the illustrated example, cut-outs 130 are provided in the first and second side flanges 128, which may further reduce the weight and material cost of the ladder trolley 100 without significantly sacrificing structural strength and rigidity of the trolley frame 102.

Referring still to FIGS. 1 to 6, in the illustrated example, the trolley frame 102 further includes webbing 132 connecting the first and second side flanges 128. As shown, webbing 132 extends laterally from the first side flange $128_1$ to the second side flange $128_2$ at the front side 122 of the trolley frame 102.

Webbing 132 can be any one or more framing members and can be made of any material as described previously with respect to the first and second side flanges 128. For example, webbing 132 can be a structural panel covering all or substantially all of the front side 122 of the trolley frame 102. Additionally, or alternatively, the webbing 132 can be one or more linear framing members, which can extend parallel to the lateral axis 120 and/or at an angle to the lateral axis 120 to provide additional bracing.

In the illustrated example, webbing 132 includes upper webbing $132_1$ and lower webbing $132_2$, shown as C-channels, which are respectively provided at the upper end 110 and the lower end 112 of the trolley frame 102. The use of C-channels for the webbing can confer similar benefits as described previously with respect to the first and second side flanges 128. For example, ladder front rollers 134, which are described in greater detail subsequently, can nest or partially-nest within web channels 133 of the webbing 132.

In the illustrated example, each of the first side flange $128_1$, the second side flange $128_2$, upper webbing $132_1$, and lower webbing $132_2$, include a plurality of apertures 136 through which bolts, pins, or other suitable mechanical fasteners may extend to connect various components of the ladder trolley 100. Connections can positionally fix the components (e.g., the first and second side flanges 128 to webbing 132) or permit relative motion in at least one degree of freedom (e.g., pairs of ladder side rollers 104 relative to the first and second side flanges 128 as described subsequently). Any other suitable connection means providing the requisite connection type (i.e., fixed, moveable) can be used. For example, in alternate embodiments, the first and second side flanges 128 can be welded to webbing 132.

Figure 2:
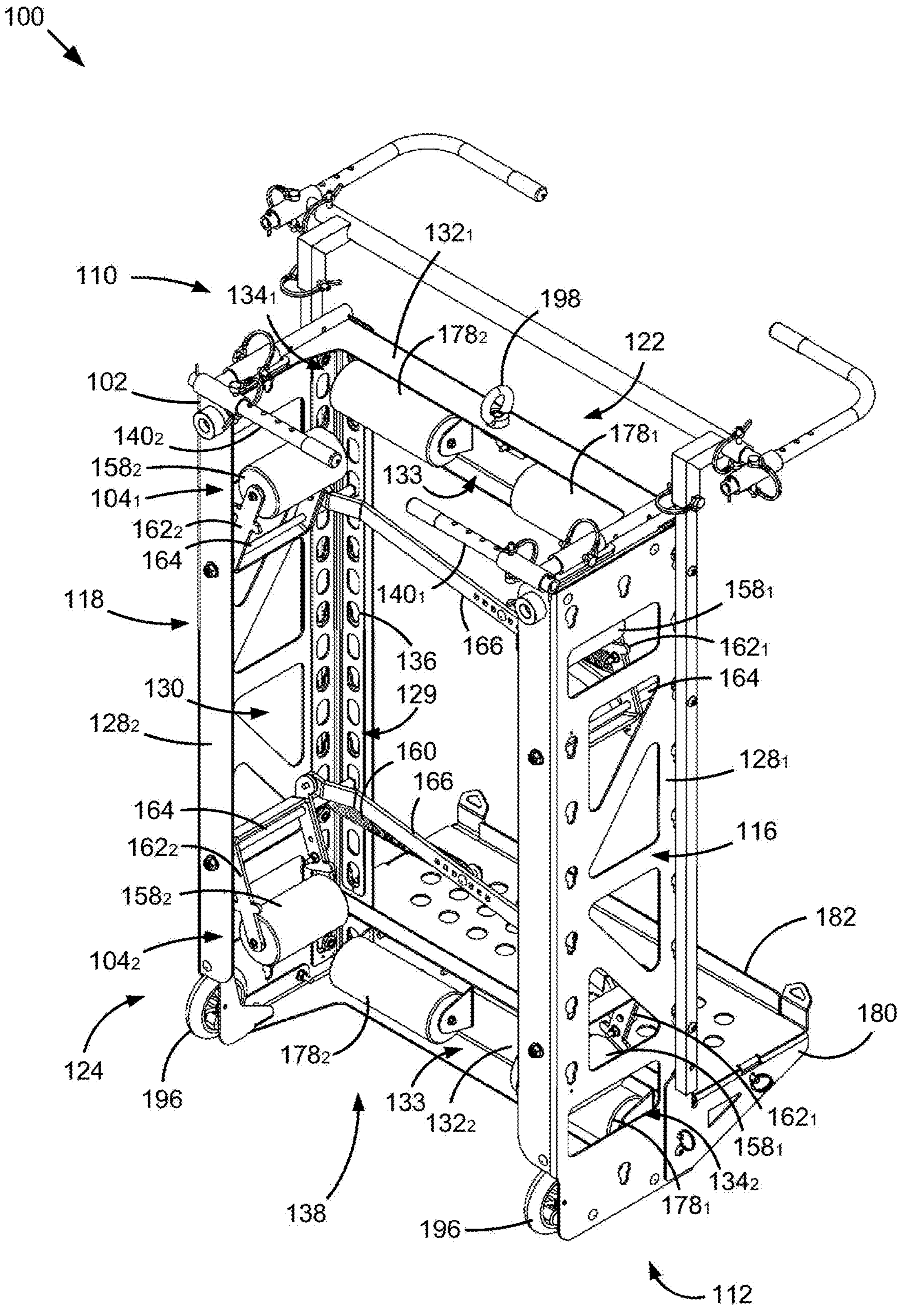
FIG. 2 is a rear perspective view of the ladder trolley of FIG. 1.
Figure 3:
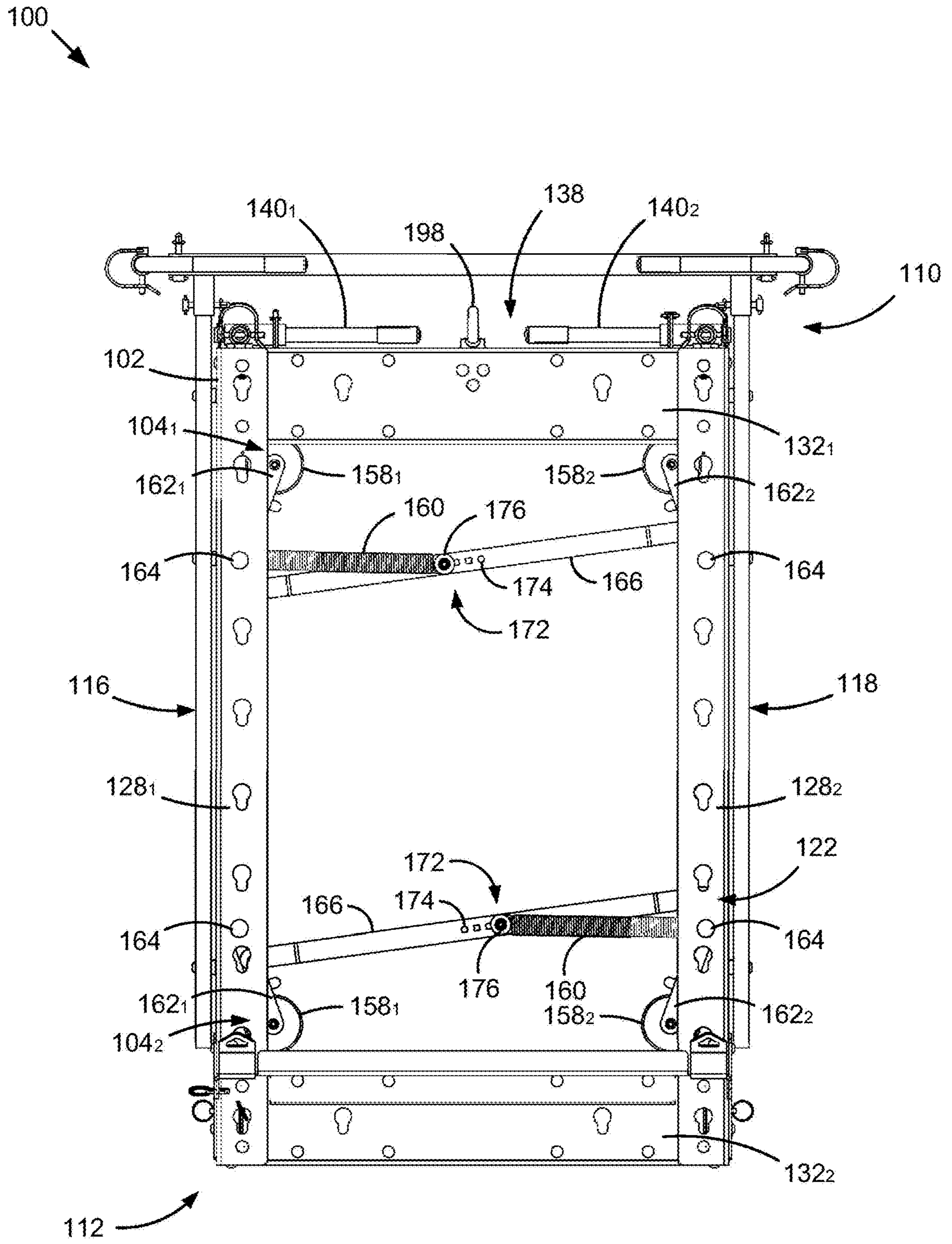
FIG. 3 is a front view of the ladder trolley of FIG. 1.
Figure 6:
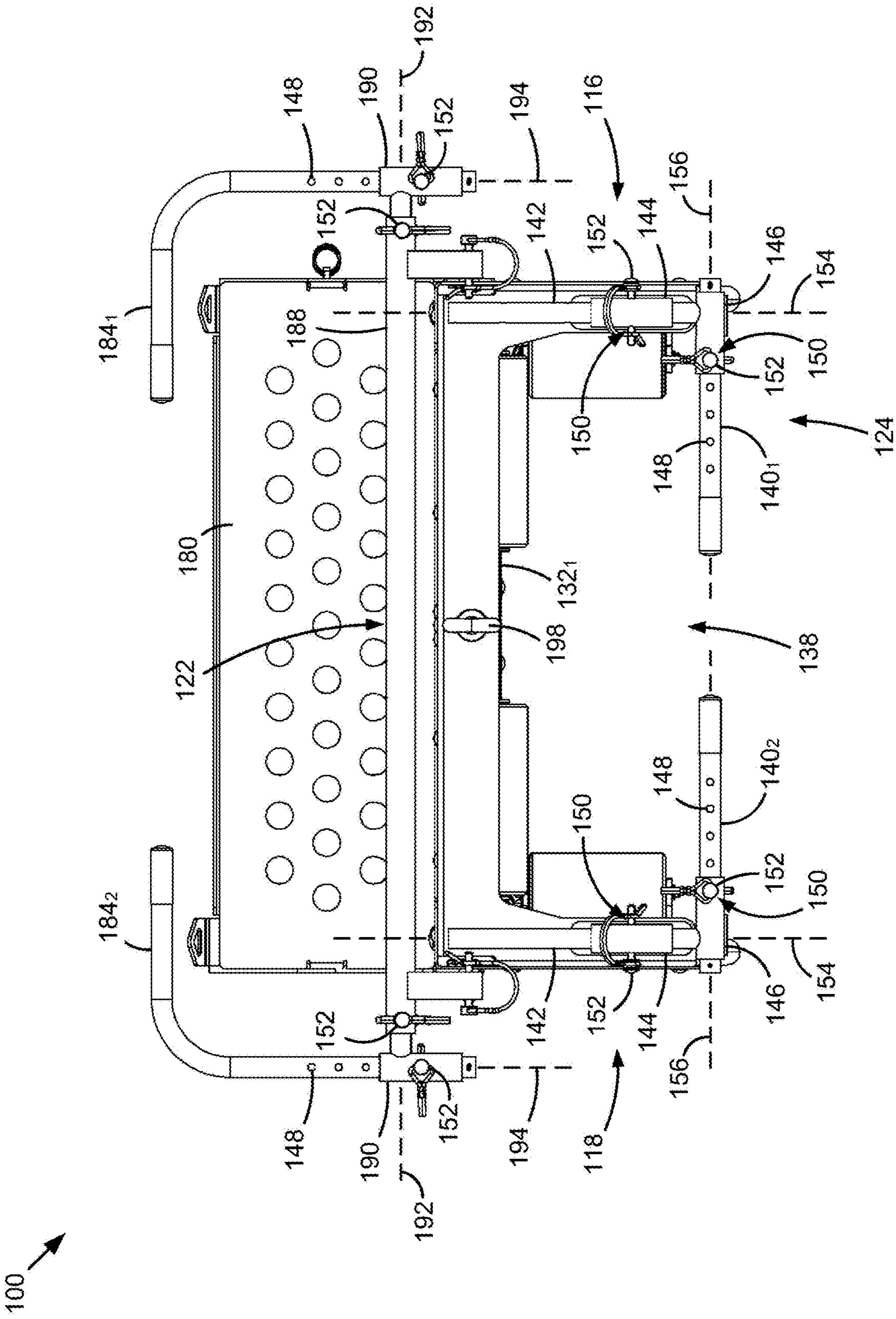
FIG. 6 is a top view of the ladder trolley of FIG. 1.

Referring to FIGS. 2 and 6, in the illustrated example, the trolley frame 102 includes a ladder travel channel 138 defined by the first side flange $128_1$, the second side flange $128_2$, and webbing 132. As shown, the ladder travel channel 138 extends from the upper end 110 to the lower end 112 of the trolley frame 102 and is open at the upper and lower ends 110, 112.

Figure 11:
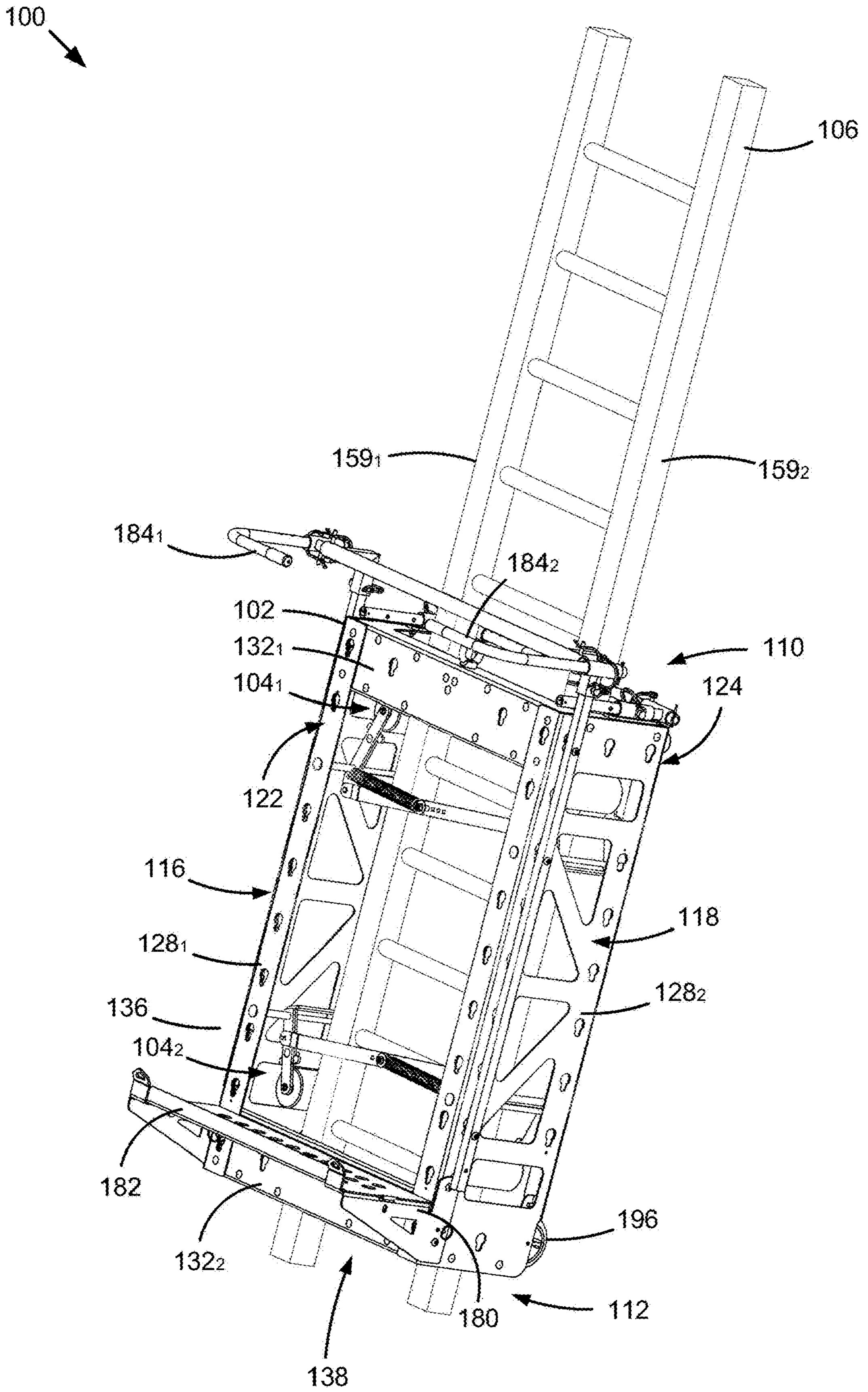
FIG. 11 is a front perspective view of the ladder trolley of FIG. 1 secured to the ladder.

As exemplified in FIG. 11, the trolley frame 102 is positionable around the ladder 106 with the ladder 106 positioned within the ladder travel channel 138 and extending through the open upper and lower ends 110, 112. In use, when the trolley frame 102 is positioned around the ladder 106, the ladder 106 acts as a rail, which guides the ladder trolley 100 as it is hoisted up the ladder 106.

Referring again to FIGS. 2 and 6, the ladder travel channel 138 is closed at the first side 116 (by the first side flange $128_1$), the second side 118 (by the second side flange $128_2$), and the front side 122 (by webbing 132), and open at the upper end 110 and the lower end 112. Optionally, the ladder travel channel 138 can be open, closed, or openable/closable at the back side 124.

In examples where the ladder travel channel 138 is open at the back side 124, the trolley frame 102 can be positioned around the ladder 106 by passing the ladder 106 through the open back side 124 and into the ladder travel channel 138. An advantage of this design is the ease with which the trolley frame 102 can be positioned around the ladder 106. As the ladder 106 is held in compression between the pair(s) of opposed ladder side rollers 104, the pairs of ladder side rollers 104 may resist the trolley frame 102 from becoming separated from the ladder 106 during hoisting operations. Additionally, as ladders are typically at an angle to the ground in normal use, the weight of the ladder trolley 100 and any payload 108 transported thereon will, under the force of gravity, encourage the trolley frame 102 to remain engaged with the ladder 106.

In examples where the ladder travel channel 138 is closed at the back side 124, the trolley frame 102 can be positioned around the ladder 106 by passing the ladder 106 through the open upper end 110 or lower end 112 and into the ladder travel channel 138. For example, the ladder 106 may be fed through the open upper and lower ends 110, 112 before erecting the ladder 106. An advantage of this design is that, since the ladder 106 would be fully surrounded by the trolley frame 102, the trolley frame 102 may not become separated from the ladder 106 during hoisting operations. Another advantage is the back side 124 of the trolley frame 102 could be enclosed by webbing 132 as described with respect to the front side 122, which may connect and provide additional support to the first and second side flanges 128 at the back side 124. The size of the first and second side flanges 128 and/or the type or amount of material used may, as a result, be decreased.

Figure 4:
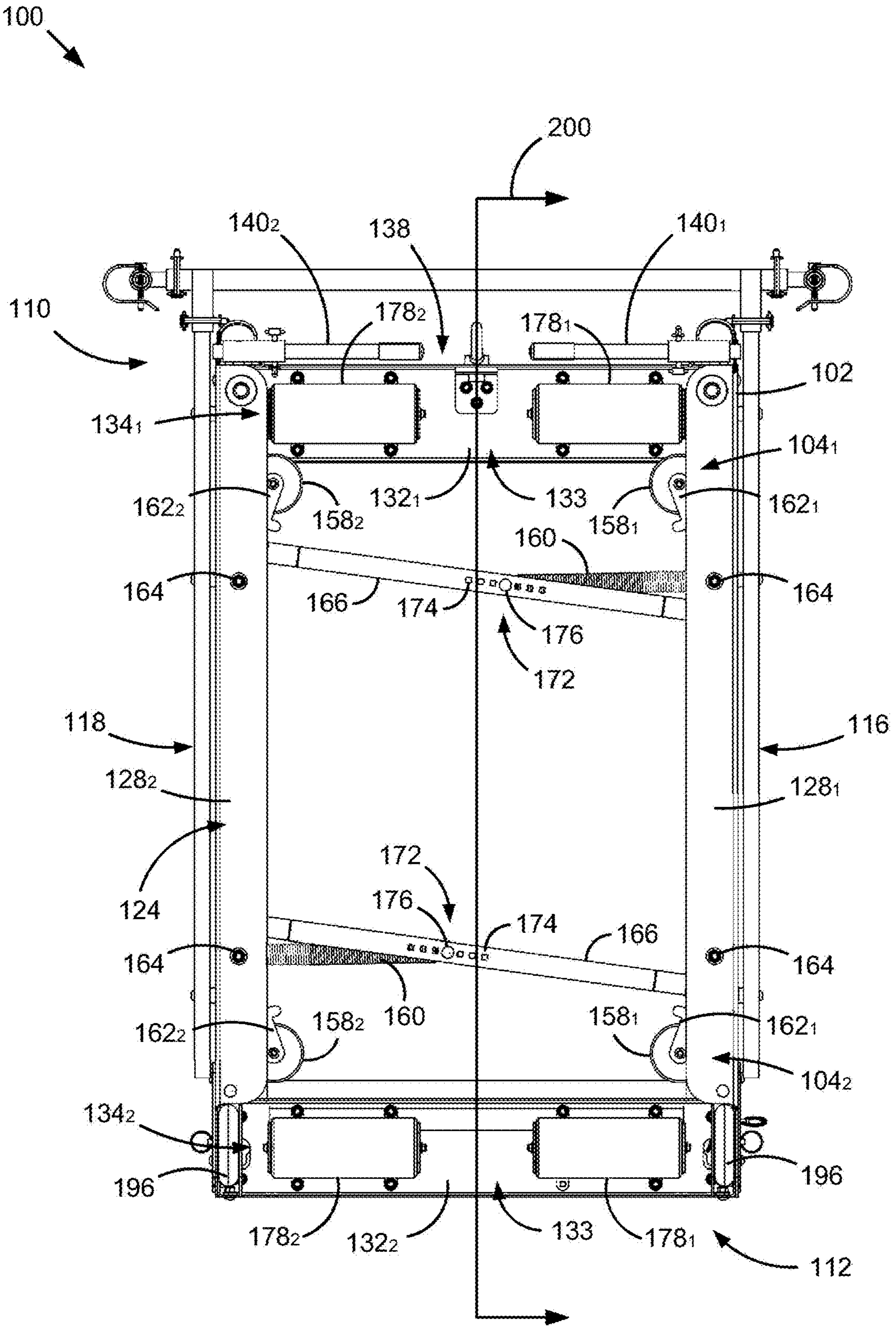
FIG. 4 is a rear view of the ladder trolley of FIG. 1.
Figure 7:
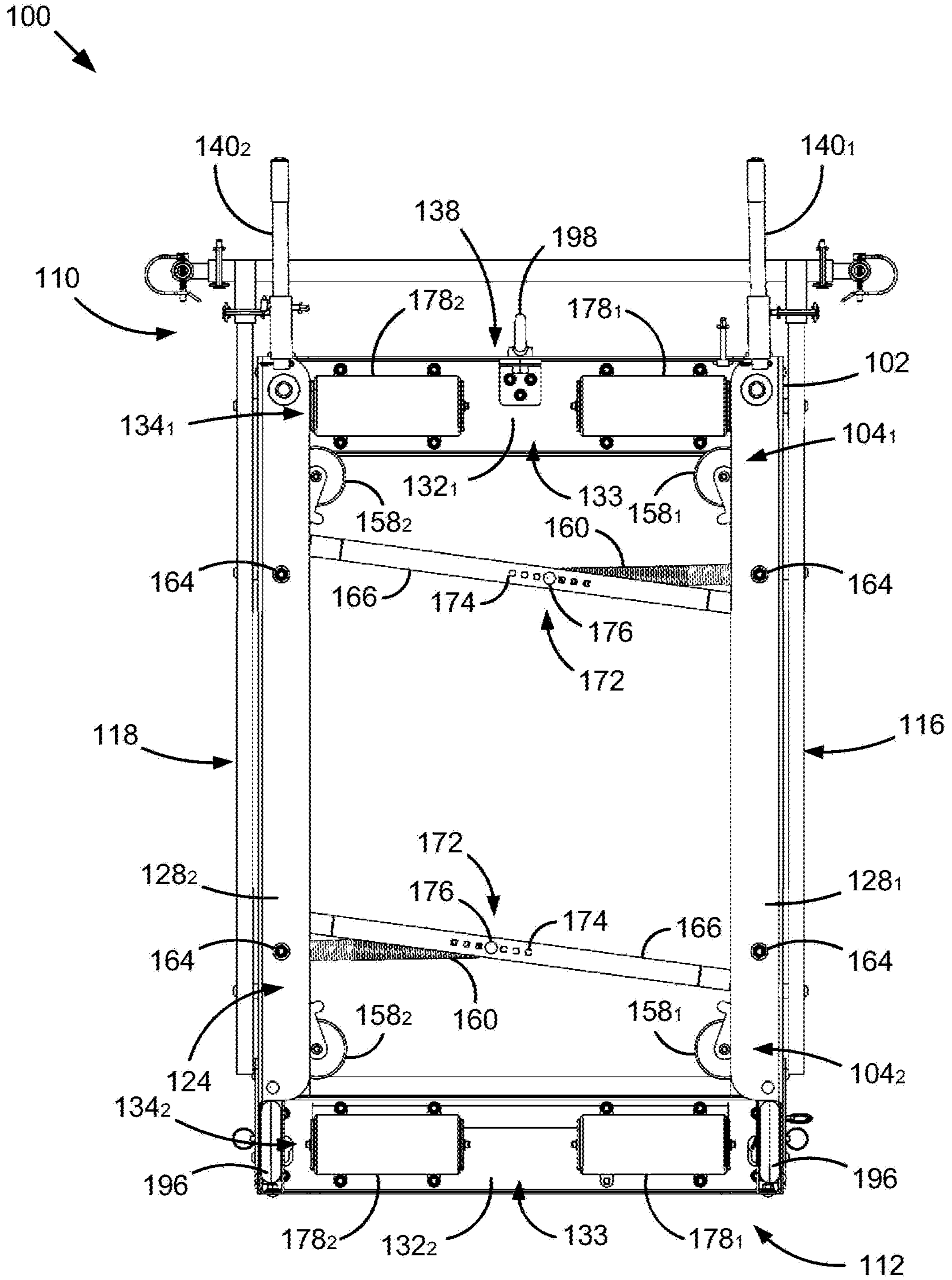
FIG. 7 is a rear view of the ladder trolley of FIG. 1 with ladder holding arms in a ladder receiving position.

Referring to FIGS. 4 and 7, in the illustrated example, the ladder travel channel 138 is openable/closable. As shown, the ladder trolley 100 includes ladder holding arms 140 (described in greater detail subsequently) that are moveable between a ladder receiving position (see e.g., FIG. 7) and a ladder holding position (see e.g., FIG. 4). In the ladder receiving position, the ladder travel channel 138 is defined by the first side flange 128$_1$, the second side flange 128$_2$, and the webbing 132, and is open at the back side 124 of the trolley frame 102. In the ladder holding position, the ladder travel channel 138 is also defined by the ladder holding arms 140 and is thus closed at the back side 124 of the trolley frame 102. This design may advantageously enable the trolley frame 102 to be more easily positioned around the ladder 106, while also preventing the trolley frame 102 from becoming separated from the ladder 106 during hoisting operations.

The ladder trolley 100 can include at least one ladder holding arm 140 connected the trolley frame 102 and movable between the ladder receiving position, in which the ladder travel channel 138 is open, and the ladder holding position, in which the ladder travel channel 138 is closed. Any number of ladder holding arms 140, having any suitable configuration (e.g., panels, linear members such as bars/rods), and mounted to the trolley frame 102 at any suitable location for opening/closing the ladder travel channel 138, can be used. For example, the ladder trolley 100 can include one, two, or more than two ladder holding arms 140.

Each ladder holding arm 140 can be movably connected and/or removably connected to the trolley frame 102 and moveable between the ladder holding and ladder receiving positions. Where the ladder holding arm(s) 140 are movably connected to the trolley frame 102, the ladder holding arm(s) 140 can be moveable in any direction. For example, the ladder holding arm(s) 140 can be pivotable/rotatable in a plane parallel to the plane defined by the longitudinal axis 114 and the lateral axis 120. As another example, the ladder holding arm(s) 140 can additionally, or alternatively, be slidably and/or telescopically moveable in the lateral direction and/or the depth direction. Any other direction of motion may be possible. Each ladder holding arm 140 can be connected to one or both of the first and second side flanges 128 at the back side 124 of the trolley frame 102 at the upper end 110, the lower end 112, or any location between the upper and lower ends 110, 112. Optionally, each ladder holding arm 140 can be lockable (e.g., by a latch, retractable pin, or other locking means) in one or both of the ladder holding position and the ladder receiving position.

Figure 5:
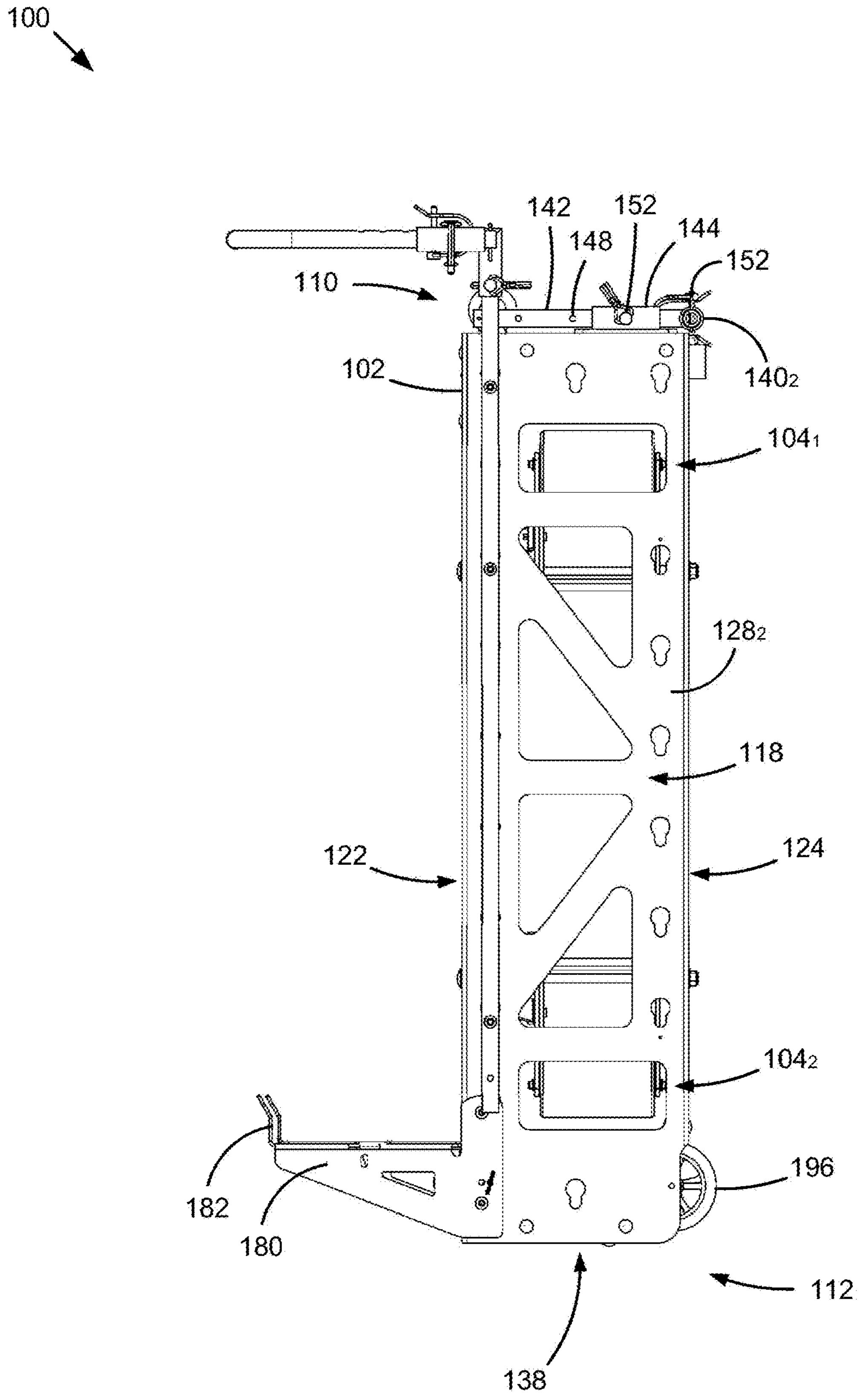
FIG. 5 is a side view of the ladder trolley of FIG. 1.

Referring to FIGS. 5 and 6, in the illustrated example, the ladder trolley 100 includes two ladder holding arms 140 connected to the trolley frame 102 at the upper end 110 thereof. The ladder holding arms 140 include a first ladder holding arm 140$_1$ connected to the first side flange 128$_1$ and a second ladder holding arm 140$_2$ connected to the second side flange 128$_2$. As shown, each of the first and second ladder holding arms 140 are connected to the first and second side flanges 128 by a respective connecting rod 142. The connecting rods 142 are slidably received in a corresponding connecting rod sleeve 144, which are coupled to a respective one of the first and second side flanges 128 at the upper end 110 of the trolley frame 102. Each connecting rod 142 includes a ladder arms sleeve 146 coupled at one end of the connecting rod 142 through which the ladder holding arms 140 are slidably received. Each of the ladder holding arms 140 and connecting rods 142 include a plurality of bores 148 spaced apart along its length. Each of the connecting rod sleeves 144 and ladder arm sleeves 146 include a pair of opposed apertures 150 through the sidewalls thereof. The connecting rods 142 can be coupled to the connecting rod sleeves 144, and the ladder holding arms 140 can be coupled to the ladder arm sleeves 146, by aligning the apertures 150 with the desired bore 148 and inserting a cotter pin 152 therethrough. Any other suitable connecting means may be used such as, for example, bolts or a biased pin provided in the connecting rods 142 and the ladder holding arms 140. An advantage of this design is that it provides the ladder holding arms 140 with 3 degrees of freedom, enabling a range of adjustability.

When the cotter pins 152 coupling the connecting rods 142 to the connecting rod sleeves 144 are removed, the connecting rods 142 can freely rotate within the connecting rod sleeves 144. Accordingly, in a first degree of freedom, the connecting rods 142, and thereby the ladder holding arms 140 coupled thereto, are rotatable about a longitudinal connecting rod sleeve axis 154, whereby the first and second ladder holding arms 140 are rotatable between the ladder holding position and the ladder receiving position.

When the cotter pins 152 coupling the connecting rods 142 to the connecting rod sleeves 144 are removed, the connecting rods 142 can freely translate within the connecting rod sleeves 144. Accordingly, in a second degree of freedom, the connecting rods 142, and thereby the ladder holding arms 140 coupled thereto, are translatable in the depth direction along the connecting rod sleeve axis 154. In this way, the depth of the ladder travel channel 138 defined when the ladder holding arms 140 are in the ladder holding position can be adjusted such that ladders of a range of thicknesses can be accommodated therein.

Similarly, when the cotter pins 152 coupling the ladder holding arms 140 to the ladder arm sleeves 146 are removed, the ladder holding arms 140 can freely translate within the ladder arm sleeves 146. Accordingly, in a third degree of freedom, the first and second ladder holding arms 140 are translatable along a longitudinal ladder arm sleeve axis 156. Translating the ladder holding arms 140 in the lateral direction along the ladder arm sleeve axis 156 can provide an additional means of moving the ladder holding arms 140 between the ladder holding position and the ladder retaining position. It will be appreciated that, while the illustrated example provides two modes of opening and closing the ladder travel channel 138, only one mode need be provided.

In the illustrated example, the first and second ladder holding arms 140 are also removable, providing yet another means to move between the ladder holding position and the ladder receiving position. As shown, the ladder holding arms 140 can be withdrawn from the ladder arm sleeves 146 when the cotter pins 152 coupling the ladder holding arms 140 to the ladder arm sleeves 146 are removed and when optional additional cotter pins 152 provided at the end of the ladder holding arms 140 are also removed.

Optionally, in a fourth degree of freedom, the ladder holding arms 140 may be rotatable about the ladder arm sleeve axis 156 or, alternatively, include ladder rear rollers (not shown) rotatable about the ladder holding arms 140. In this way, if the ladder 106 contacts the ladder holding arms 140 (or ladder rear rollers rotatably mounted thereon) during hoisting operations, the ladder holding arms 140 (or ladder rear rollers) may roll along the ladder 106 as the ladder trolley 100 is lifted (i.e., in the upward direction) or lowered (i.e., in the downward direction). This may prevent frictional resistance to lifting the ladder trolley 100 from being generated by contact between the ladder 106 and the ladder holding arms 140 and may provide additional stability to the trolley frame 102 around the ladder 106.

In some embodiments, the ladder trolley 100 can include at least one pair of ladder side rollers 104 moveably connected to the trolley frame 102. For example, in the example shown in FIGS. 8 and 9 (showing cross-sectional views of the ladder trolley taken along line 200 of FIG. 4), the ladder trolley 100 includes a first pair of ladder side rollers $\mathbf{104}_1$ and a second pair of ladder side rollers $\mathbf{104}_2$. The first pair of ladder side rollers $\mathbf{104}_1$ is moveably connected to the trolley frame 102 proximate the upper end 110. The second pair of ladder side rollers $\mathbf{104}_2$ is moveably connected to the trolley frame 102 proximate the lower end 112. As shown, each pair of ladder side rollers 104 has a first ladder side roller $\mathbf{158}_1$ moveably connected to the first side flange $\mathbf{128}_1$ and a second ladder side roller $\mathbf{158}_2$ moveably connected to the second side flange $\mathbf{128}_2$. Any number of pairs of ladder side rollers 104 can be used.

Figure 9:
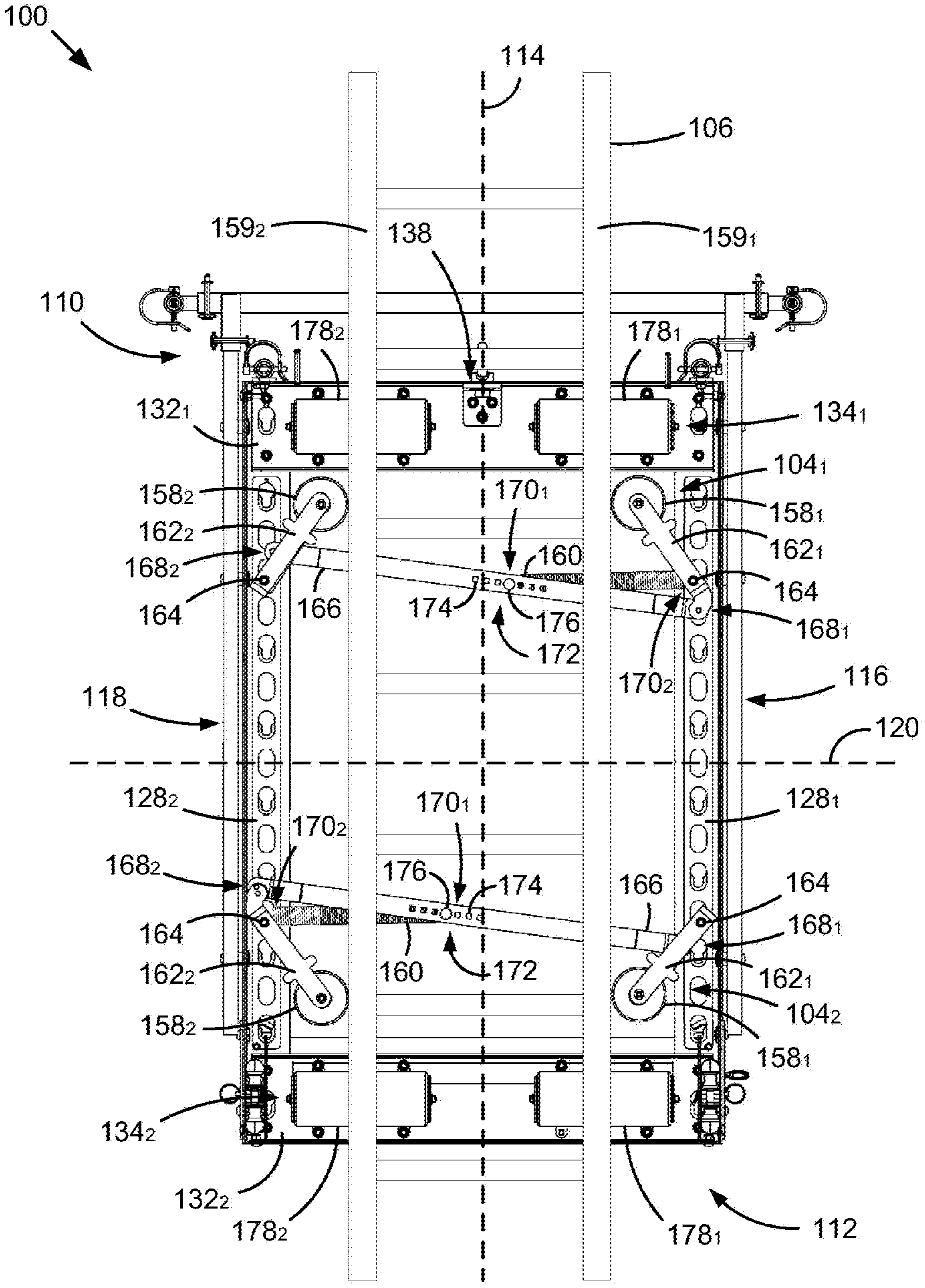
FIG. 9 is a rear cross-sectional view of the ladder trolley of FIG. 1 with the ladder side rollers engaging the ladder.

As shown in FIG. 9, the ladder 106 has opposed longitudinally extending rails 159 and, in use, the first ladder side roller $\mathbf{158}_1$ engages a first longitudinally extending ladder rail $\mathbf{159}_1$ and the second ladder side roller $\mathbf{158}_2$ engages a second longitudinally extending ladder rail $\mathbf{159}_2$. As the ladder trolley 100 is hoisted up the ladder 106, the ladder 106 is held in compression between the pairs of opposed ladder side rollers 104. When the first and second ladder side rollers 158 are in engagement with the first and second ladder rails 159, the ladder side rollers 158 will roll along the ladder rails 159 as the ladder trolley 100 is hoisted (i.e., in the upward direction) or lowered (i.e., in the downward direction), enabling the ladder 106 to be held without inducing frictional resistance to hoisting the ladder trolley 100 by contact between fixed parts.

The ladder side rollers 158 can have any configuration suitable for engaging the ladder rails 159, such as cylindrical (as shown), spherical, and flat or disc shaped (i.e., slider). Accordingly, the ladder side rollers 158 as described herein can alternately be more generally referred to as ladder side guides 158. The first and second ladder side rollers 158 can be any suitable material, such as metal, plastic, rubber, foam, or any combination thereof. For example, cylindrical or spherical ladder side rollers 158 can have a metal cylindrical core with a resiliently compressible outer layer. Using a resiliently compressible material such as rubber at least as the outer layer of the ladder side rollers 158 may advantageously provide noise dampening as the ladder side rollers 158 roll along the ladder rails 159 and improve the hold of the ladder 106 between the pairs of ladder side rollers 104. As another example, flat or disc shaped ladder side rollers 158 can have a metal base and a ladder engagement surface made of a polymer having a low coefficient of friction (e.g., Ultra High Molecular Weight Plastic, Polytetrafluoroethylene, and the like).

In the illustrated example, the first and second ladder side rollers 158 are connected to the first and second side flanges 128 such that the ladder side rollers 158 are aligned in the longitudinal direction and the depth direction. In this way, the first ladder side roller $\mathbf{158}_1$ can be biased laterally towards the second ladder side roller $\mathbf{158}_2$, and the second ladder side roller $\mathbf{158}_2$ can be biased laterally towards the first ladder side roller $\mathbf{158}_1$. An advantage of aligning the first and second ladder side rollers 158 is that the force of each opposed pair of ladder side rollers 104 on the ladder rails 159 may be similarly aligned, which may improve the hold of the ladder 106 between the pairs of ladder side rollers 104. That is, the pairs of ladder side rollers 104 holding the ladder 106 may do so without inducing a torque (e.g., by offset opposed forces inducing a rotation). This may assist in maintaining the orientation of the trolley frame 102 around the ladder 106.

To hold the ladder 106 between the pairs of ladder side rollers 104, the first and second ladder side rollers 158 can be laterally moveable and resiliently biased laterally into the ladder travel channel 138. Any type of resilient bias can be used to laterally resiliently bias the first and second ladder side rollers 158 into the ladder travel channel 138. The resilient bias can be, for example, a spring (e.g., tension, compression, or torsion), an elastomeric tensile material (e.g., band), an elastomeric compressible material (e.g., rubber), or a fluid (e.g., hydraulic or pneumatic) system. The first and second ladder side rollers 158 can be individually biased (i.e., each biased by a different resilient bias) or share a common bias. For example, in the example shown in FIGS. 8 and 9, each pair of ladder side rollers 104 of the ladder trolley 100 share a common resilient bias 160, shown as a tension spring.

The number and type of resilient bias(es) used may depend on the type of moveable connection used between the first and second ladder side rollers 158 and the first and second side flanges 128. For example, where the first and second ladder side rollers 158 are translatably/slidably connected to the first and second side flanges 128, each of the first and second ladder side rollers 158 may be biased from the first and second side flanges 128 into the ladder travel channel 138 by a compression spring, elastomeric compressible material, or hydraulic/pneumatic system, which linearly push the first and second ladder side rollers 158 laterally inwardly into the ladder travel channel 138 from the first and second side flanges 128. As another example, where the first and second ladder side rollers 158 are rotatably/pivotably connected to the first and second side flanges 128, each of the first and second ladder side rollers 158 may be biased from the first and second side flanges 128 into the ladder travel channel 138 by a torsion spring, which rotates the first and second ladder side rollers 158 laterally inwardly into the ladder travel channel 138 from the first and second side flanges 128. Other connection types, types of resilient biases, and any other combination thereof, may be possible.

Referring again to FIGS. 8 and 9, in the illustrated example, the first ladder side roller $\mathbf{158}_1$ and the second ladder side roller $\mathbf{158}_2$ are pivotably coupled to the first side flange $\mathbf{128}_1$ and the second side flange $\mathbf{128}_2$ by a linkage assembly including a first lever arm $\mathbf{162}_1$ and a second lever arm $\mathbf{162}_2$. The first and second lever arms 162 include two prongs, and the first and second ladder side rollers 158 are rotatably coupled to the first and second lever arms 162 between the two prongs at a distal end thereof (see e.g., FIG. 1). The first and second lever arms 162 are coupled to the first and second side flanges 128 by an axle 164 extending through the flange channel 129 from the front side 122 to the back side 124 of the trolley frame 102. Accordingly, the first and second lever arms 162, and thereby the first and second ladder side rollers 158 rotatably coupled thereto, are rotatable about the axle 164 in a plane defined by the longitudinal axis 114 and the lateral axis 120.

The first and second lever arms 162 can be individually resiliently biased, such as by a torsion spring, such that each of the first and second ladder side rollers 158 can independently rotate laterally inwardly into the ladder travel channel 138. In the illustrated example, the linkage assembly of each pair of ladder side rollers 104 further includes a central link 166 coupling the first lever arm $\mathbf{162}_1$ and the second lever arm $\mathbf{162}_2$, thereby coupling the movement of the lever arms 162 such that the lever arms 162 can share the common resilient bias 160. As shown, the central link 166 has a first link end $\mathbf{168}_1$ connected to the first lever arm $\mathbf{162}_1$ at a first longitudinal position below the axle 164 thereof (i.e., in the downward direction) and a second link end $\mathbf{168}_2$ connected to the second lever arm $\mathbf{162}_2$ at a second longitudinal position above the axle 164 thereof (i.e., in the upward direction). The first and second link ends 168 are therefore spaced apart in the longitudinal direction such that the central link 166 extends at an angle to the lateral axis 120 and the axles 164 are at a third longitudinal position between the first and second longitudinal positions of the first and second link ends 168.

An advantage of this design is that, by linking the first lever arm $\mathbf{162}_1$ and the second lever arm $\mathbf{162}_2$ via the central link 166, lateral displacement of one of the first and second ladder side rollers 158 may cause an equal and opposite lateral displacement of the other of the first and second ladder side rollers 158. For example, as exemplified in the schematic diagram of FIG. 15A, a load force $F_L$ applied to the second ladder side roller $\mathbf{158}_2$ displaces the second ladder side roller $\mathbf{158}_2$ laterally outwardly and, at the same time, causes an equal and opposite displacement of the first ladder side roller $\mathbf{158}_1$ (displacements indicated by the stippled lines). Further, as exemplified in the schematic diagram of FIG. 15B, this design enables a biasing force $F_{SP}$ of the single common resilient bias 160 to simultaneously resiliently bias both the first and second ladder side rollers 158 laterally inwardly into the ladder travel channel 138 such that the first and second ladder side rollers 158 may hold the ladder 106 in compression with equal and opposite force. Furthermore, by synchronizing movement of the first and second ladder side rollers 158 via the linkage assembly, a relatively consistent spacing may be maintained between the ladder rails 159 of the ladder 106 and the first and second side flanges 128 of the trolley frame 102, including where the center of gravity of the payload 108 is off-center on the ladder trolley 100 and encouraging the trolley frame 102 to tilt. In this way, the orientation of the ladder trolley 100 relative to the ladder 106 may be considered self-correcting. It will be appreciated that individually resiliently biasing the first and second ladder side rollers 158 may also render the orientation of the ladder trolley 100 relative to the ladder 106, to an extent, self-correcting.

An advantage of resiliently biasing the first and second ladder side rollers 158 is that the biasing force can be overcome (or removed, as described subsequently) to move the first and second ladder side rollers 158 away from each other and out or partially out of the ladder travel channel 138. A resilient bias can deform under load (e.g., when moved by user or by pressure from the ladder when hoisting an imbalanced load) but restore its shape upon removal of the load. As such, in use, the biasing force $F_{SP}$ can be overcome by a user to move the ladder side rollers 158 laterally outwardly out of the ladder travel channel 138, which may improve ease of positioning the trolley frame 102 around the ladder 106 and may enable use with ladders 106 of greater widths. Further enhancing these benefits, where the first and second side flanges 128 are C-channels, the user can move the first and second ladder side rollers 158 into or partially into the flange channels 129 of the first and second side flanges 128. This extra range of motion enables the first and second ladder side rollers 158 to be moved further out of the ladder travel channel 138 such that the ladder travel channel 138 can be unobstructed or substantially unobstructed by the ladder side rollers 158 when positioning the trolley frame 102 around the ladder 106. Subsequently, once the ladder 106 is positioned in the ladder travel channel 138, the lateral biasing force $F_{SP}$ can be released (or restored) to move the first and second side rollers 158 laterally into the ladder travel channel 138 and into engagement with the ladder rails 159.

Figure 15A:
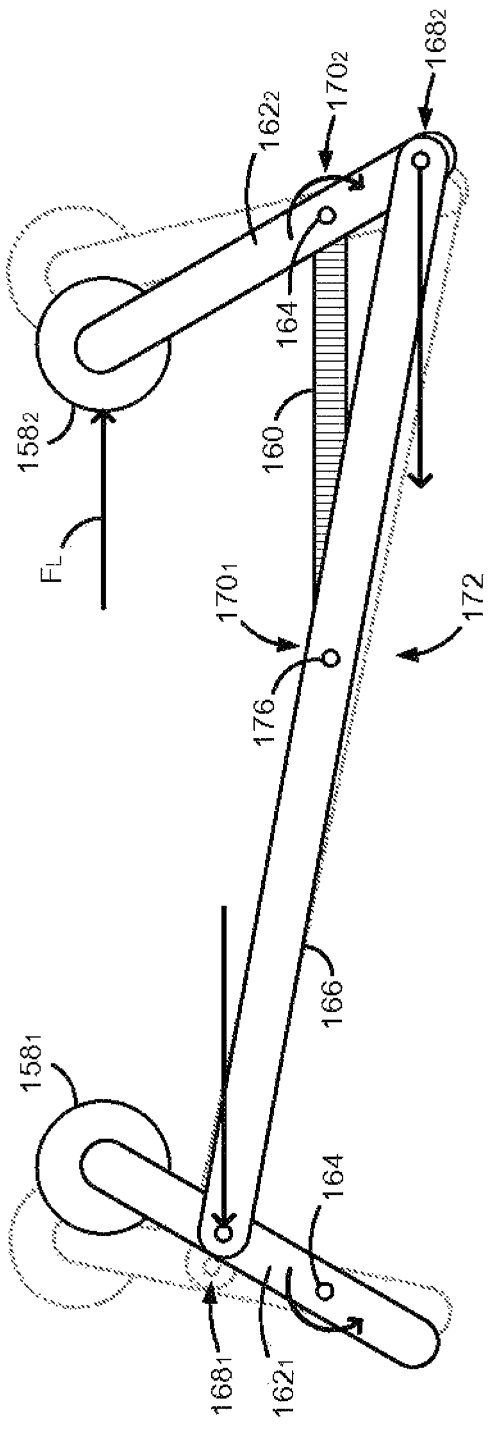
FIG. 15A is a front schematic view of a pair of ladder side rollers of the ladder trolley of FIG. 1 being moved laterally away from each other.
Figure 15B:
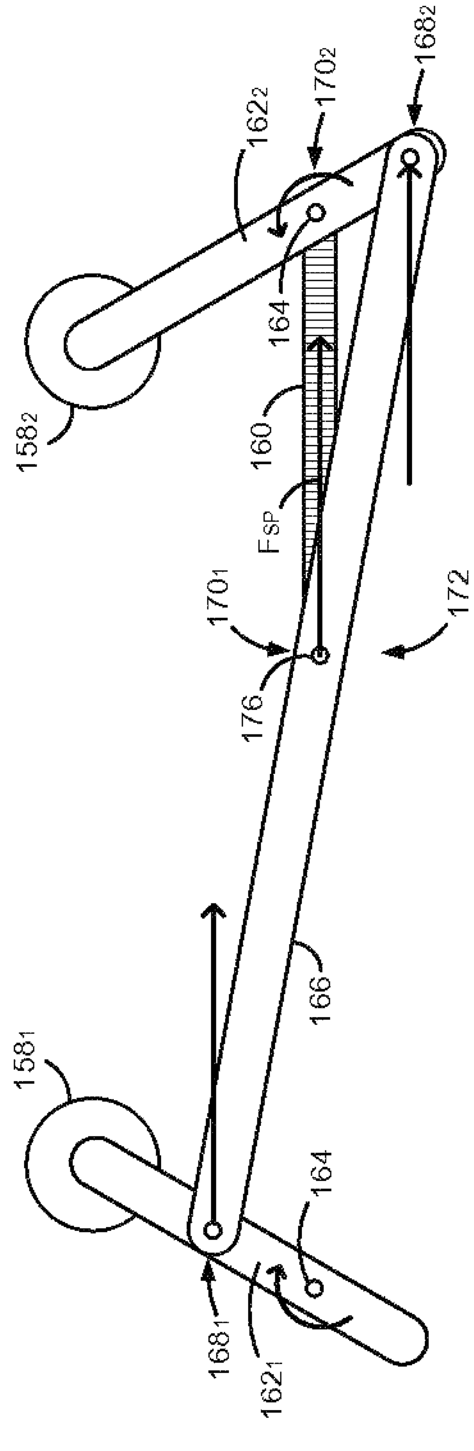
FIG. 15B is a front schematic view of the pair of ladder side rollers of the ladder trolley of FIG. 1 being biased laterally toward each other.

Referring to FIGS. 15A and 15B, the resilient bias 160 of each pair of ladder side rollers 104 has a first bias end $\mathbf{170}_1$ connected to a middle portion 172 of the central link 166 and a second bias end $\mathbf{170}_2$. The second bias end $\mathbf{170}_2$ can be connected to any suitable fixed point such as one of the first and second side flanges 128 or, as exemplified, to the axle 164 of one of the first and second lever arms 162. In this way, as shown in FIG. 15B, the biasing force $F_{SP}$ of the resilient bias 160 pulls the middle portion 172 of the central link 166 toward the fixed second bias end $\mathbf{170}_2$. The biasing force $F_{SP}$, in turn, pulls the first link end $\mathbf{168}_1$ (coupled to the first lever arm $\mathbf{162}_1$ above the axle 164), thereby rotating the first ladder side roller $\mathbf{158}_1$ clockwise about the axle 164. At the same time, the biasing force $F_{SP}$ pushes the second link end $\mathbf{168}_2$ (coupled to the second lever arm $\mathbf{162}_2$ below the axle 164) and thereby rotates the second ladder side roller $\mathbf{158}_2$ counterclockwise about the axle 164. The biasing force $F_{SP}$ of the resilient bias 160 thus laterally resiliently biases the first and second ladder side rollers 158 into the ladder travel channel 138. The biasing force $F_{SP}$ counters any load force (e.g., from the ladder) applied to one or both of the ladder side rollers 158, such as the load force $F_L$ exemplified in FIG. 15A.

Figure 8:
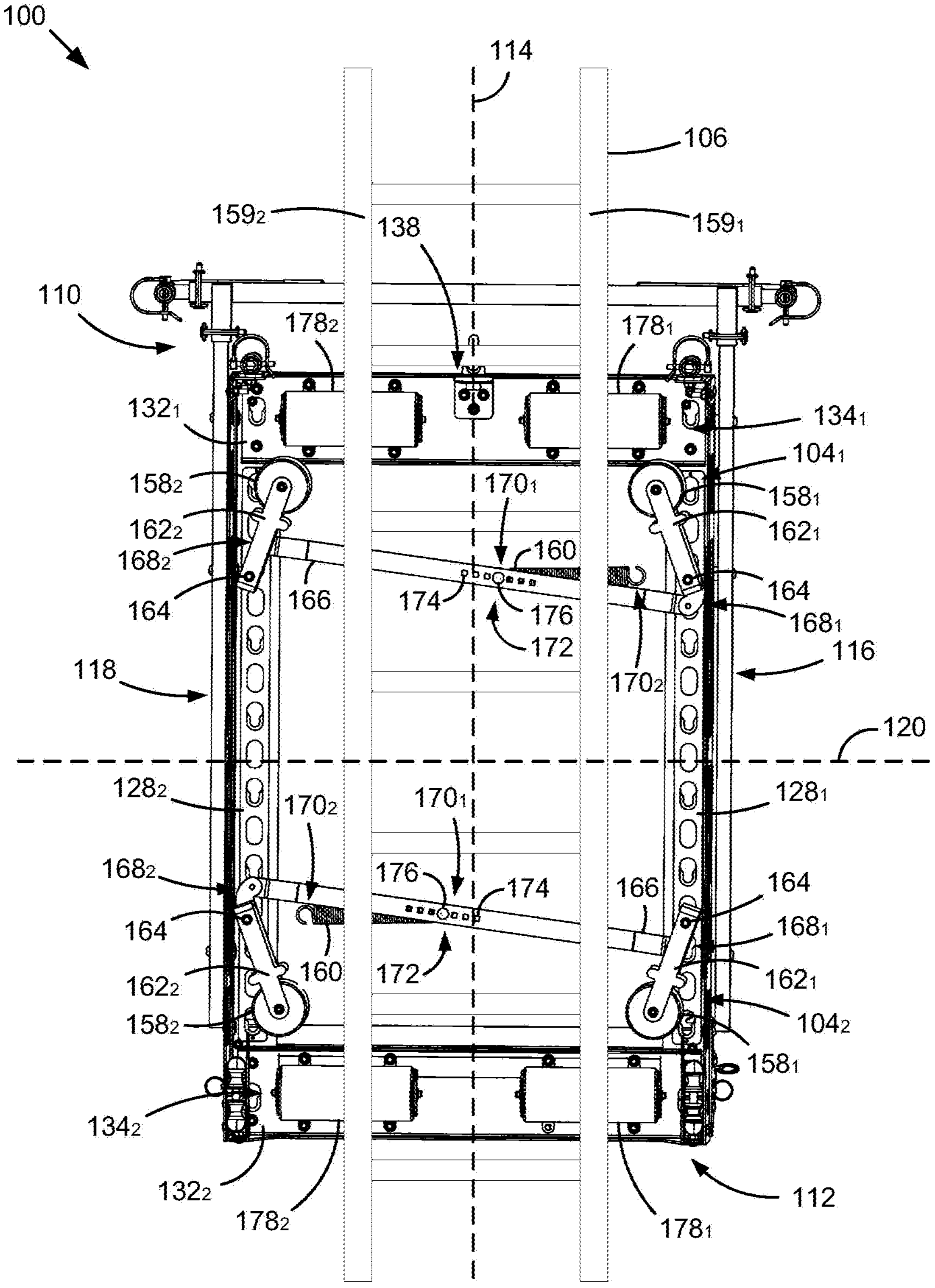
FIG. 8 is a rear cross-sectional view of the ladder trolley of FIG. 1 with ladder side rollers spaced apart from a ladder.

In some embodiments, at least one of the first and second bias ends 170 can be removably connectable. For example, in the example shown in FIGS. 8 and 9, for each of the first pair of ladder side rollers $\mathbf{104}_1$ and the second pair of ladder side rollers $\mathbf{104}_2$, the second bias end $\mathbf{170}_2$ of the resilient bias 160 is removably connected to the axle 164 of one of the first and second lever arms 162. As shown in FIG. 8, the second bias end $\mathbf{170}_2$ can be disconnected from the axle 164 and the first and second ladder side rollers 158 can be moved laterally outwardly as described previously with respect to FIG. 15A without resistance from the resilient bias 160. Once the trolley frame 102 is positioned around the ladder 106 as shown in FIG. 8, the second bias end $\mathbf{170_2}$ of the resilient bias 160 can be reconnected to the appropriate axle 164, thus restoring the biasing force of the resilient bias 160, which then biases the first and second ladder side rollers 158 laterally inwardly into the ladder travel channel 138 and into engagement with the ladder rails 159 of the ladder 106.

Additionally, or alternatively, the first bias end $\mathbf{170_1}$ of the resilient bias 160 can be removably connected to the central link 166. The central link 166 can provide at least one bias coupling location to which the first bias end $\mathbf{170_1}$ can be removably connected. For example, referring still to FIGS. 8 and 9, the central link 166 includes a plurality of bias coupling locations 174 spaced apart along the middle portion 172 thereof. The bias coupling locations 174 can provide any means for removably connecting the first bias end $\mathbf{170_1}$ to the central link 166. In illustrated example, the bias coupling locations 174 are apertures in the central link 166 through which a mechanical fastener 176, shown as a bolt, can be received. In use, the first bias end $\mathbf{170_1}$ of the resilient bias 160 can be hooked onto the mechanical fastener 176 and, optionally, the mechanical fastener 176 can be tightened to secure the first bias end $\mathbf{170_1}$ to the bias coupling location 174 between the central link 166 and the mechanical fastener 176 (e.g., a flange thereof or a washer). Any other means may be used. For example, the mechanical fastener 176 can be an eye bolt, and the first bias end $\mathbf{170_1}$ can be hooked onto the eye bolt.

In addition, or as an alternative to at least one of the first and second bias ends 170 being removably connectable, the biasing force $F_{SP}$ of the resilient bias 160 can be adjustable or controllable (e.g., by tightening). For example, in the example shown in FIGS. 8 and 9, the mechanical fastener 176 can be disconnected from a first coupling location of the plurality of bias coupling locations 174 and connected to a second coupling location of the plurality of bias coupling locations 174. Where the selected second coupling location is closer to the axle 164, the biasing force $F_{SP}$ of the resilient bias 160 may be decreased. Where the selected second coupling location is further from the axle 164, the biasing force $F_{SP}$ of the resilient bias 160 may be increased.

An adjustable biasing force may advantageously enable the biasing force $F_{SP}$ to be decreased before moving the ladder side rollers 158 laterally outwardly out of the ladder travel channel 138 to position the trolley frame 102 around the ladder 106. Once the trolley frame 102 is positioned around the ladder 106, the biasing force $F_{SP}$ can then be increased to move the ladder side rollers 158 laterally inwardly into the ladder travel channel 138 and into engagement with the ladder 106. An adjustable biasing force may also advantageously enable the biasing force $F_{SP}$ to be increased or decreased depending on how far laterally inwardly it is desired to draw the ladder side rollers 158 (e.g., depending on the width of the ladder) and/or depending on the compressive holding force of the ladder side rollers 158 on the ladder (e.g., depending on the weight of the payload).

In some embodiments, the ladder trolley 100 can further include at least one ladder front roller 134. Each ladder front roller 134 can be connected to the trolley frame 102 at any location within the ladder travel channel 138 such that, when the trolley frame 102 is positioned around the ladder 106, each ladder front roller 134 engages a front surface of the ladder rails 159. For example, as exemplified in FIG. 4, the ladder front rollers 134 are connected to the webbing 132 within the web channels 133.

Any number of ladder front rollers 134 can be used, and the ladder front rollers 134 can be connected to the trolley frame 102 at any suitable location. This may depend on the type of webbing 132 (e.g., panel, cross-beams, etc.). For example, referring to FIG. 4, the at least one ladder front roller 134 includes an upper ladder front roller $\mathbf{134_1}$ and a lower ladder front roller $\mathbf{134_2}$. As exemplified, the upper ladder front roller $\mathbf{134_1}$ can be connected to the trolley frame 102 proximate the upper end 110, and the lower ladder front roller $\mathbf{134_2}$ can be connected to the trolley frame 102 proximate the lower end 112. In particular, the upper ladder front roller $\mathbf{134_1}$ is rotatably connected to the upper webbing $\mathbf{132_1}$, and the lower ladder front roller $\mathbf{134_2}$ is rotatably connected to the lower webbing $\mathbf{132_2}$.

In some embodiments, each ladder front roller 134 can be a single, continuous roller rotatably connected to the trolley frame 102 such that, in use, the single ladder front roller 134 simultaneously contacts and rolls along both of the ladder rails 159. Similarly, where the at least one ladder front roller 134 includes an upper and lower ladder front roller 134, each of the upper and lower ladder front rollers 134 can be a single, continuous roller.

Alternately, in some embodiments, each ladder front roller 134 can be divided into a pair of ladder front rollers 178 including a first ladder front roller $\mathbf{178_1}$ and a second ladder front roller $\mathbf{178_2}$. The first ladder front roller $\mathbf{178_1}$ can be laterally spaced apart from the second ladder front roller $\mathbf{178_2}$ such that, in use, the first and second ladder front rollers 178 each contact and roll along a respective one of the ladder rails 159. For example, as exemplified in FIG. 4, each of the upper and lower ladder front rollers 134 is divided into first and second ladder front rollers 178 laterally spaced apart and rotatably connected to the upper and lower webbing 132 in the web channels 133 thereof. In use, as shown in FIGS. 8 and 9, the first ladder front roller $\mathbf{178_1}$ of the upper and lower ladder front rollers 134 contacts and rolls along the first ladder rail $\mathbf{159_1}$ of the ladder 106, and the second ladder front roller $\mathbf{178_2}$ of the upper and lower ladder front rollers 134 contacts and rolls along the second ladder rail $\mathbf{159_2}$ of the ladder 106.

When hoisting the ladder trolley 100 up the ladder 106, the ladder front rollers 134 may reduce frictional resistance against hoisting the trolley frame 100 that could otherwise be caused by contact of fixed parts. The ladder front rollers 134 can be any material(s), such as described previously with respect to the ladder side rollers 158.

The ladder trolley 100 can further include means for supporting the payload 108. For example, the ladder trolley 100 can include one or more payload supports (e.g., shelves, sets of two or more spaced apart arms or hangers (e.g., "L" or "J" shaped), magnets, ties, and the like) connected to the trolley frame 102. Each payload support may be connected to any portion of the trolley frame 102, such as the first side 116, second side 118, or front side 122, at any location between the upper and lower ends 110, 112. Each payload support may also be exterior to the ladder travel channel 138. That is, each payload support may be connected to an outwardly facing side of the trolley frame 102 opposite an inwardly facing side of the trolley frame 102, where the inwardly facing sides face the ladder travel channel 138. Referring to FIGS. 1 and 5, in the illustrated example, the ladder trolley 100 includes a payload support 180, shown as a shelf, connected to the trolley frame 102 proximate the lower end 112. As shown, the payload support 180 extends outwardly from the front side 122 of the trolley frame 102 generally in the forward direction and away from the ladder travel channel 138. In other embodiments, the payload support 180 may extend outwardly from the first or second side 116, 118 of the trolley frame 102 generally in the lateral direction and away from the ladder travel channel 138. In further embodiments, the payload support 180 may not extend outwardly from (e.g., be flush with) the trolley frame 102 (e.g., where the payload support is one or more magnets).

Optionally, the payload support 180 can be removably connected to the trolley frame 102. For example, the payload support 180 can be coupled to the first and second side flanges 128 by mechanical fasteners (e.g., bolts, cotter pins) removably received through the apertures 136 in the side flanges 128. In such examples, the payload support 180 may be disconnected from the trolley frame 102 by removing the mechanical fasteners from the apertures 136 in the side flanges 128 and subsequently reconnected to the trolley frame 102 using the mechanical fasteners at different apertures 136 at any other location between the upper end 110 and lower end 112. Optionally, one or more additional payload supports may be used and removably connected to the trolley fame 102. In these embodiments, the ladder trolley 100 can be configured depending on the size of the payload 108 and/or number of discrete elements making up the payload 108. For example, the payload support 180 may be connected to the trolley frame 102 proximate the lower end 112 for a tall payload (e.g., solar panels, skylight, etc.), or connected to the trolley frame 102 proximate the upper end 110 for a shorter payload (e.g., roofing shingles, bricks, etc.).

Optionally, as exemplified in FIG. 14, where the payload support 180 extends outwardly from the trolley frame 102 the payload support 180 can include a payload retention lip 182. The payload retention lip 182 may prevent the payload 108 from sliding off of such payload supports 180 during transportation of the payload 108.

The ladder trolley 100 can further include means for securing the payload 108 to the ladder trolley 100, such as at least one payload holding arm. Any number of payload holding arms, having any suitable configuration (e.g., ratchet straps, linear members such as bars/rods) can be used. For example, as exemplified in FIGS. 12 and 13, the ladder trolley 100 includes two payload holding arms 184 moveably connected to the trolley frame 102 proximate the upper end 110 at the front side 122 of the trolley frame 102. The payload holding arm(s) 184 can be mounted to the trolley frame 102 at any other suitable location for securing the payload 108 to the ladder trolley 100. For example, each payload holding arm 184 can be connected to the first or second side flange 128 at the front side 122 of the trolley frame 102 at the upper end 110 (as shown), the lower end 112, or any location between the upper and lower ends 110, 112.

Each payload holding arm 184 can be movably connected (e.g., pivotably, rotatably, slideably, telescopically, or any combination thereof) to the trolley frame 102 such that each payload holding arm 184 can be moveable between a payload receiving position, in which a payload is positionable on the payload support 180, and a payload holding position, in which the payload holding arm(s) 184 may secure the payload 108 to the ladder trolley 100. Alternatively, or in addition, each payload holding arm 184 can be removably connected to the trolley frame 102 and can be disconnected and subsequently reconnected to move between the payload receiving position and the payload holding position.

Where the payload holding arm(s) 184 are movably connected to the trolley frame 102, the payload holding arm(s) 184 can be movable in any direction of motion, which may depend on the type of moveable connection. For example, in the example shown in FIG. 6, the payload holding arms 184 are sideable/translatable in the depth direction, which may enable the payload holding arms 184 to accommodate and hold payloads 108 of a range of thicknesses. In the example shown, the payload holding arms 184 are also telescopically moveable in the lateral direction which may enable the payload holding arms 184 to accommodate and hold payloads 108 of a range of widths. In the example shown, the payload holding arms 184 are also pivotable/rotatable in a plane parallel to the plane defined by the longitudinal axis 114 and the lateral axis 120.

In some embodiments, the payload holding arms 184 may be rotated to move to the payload receiving position (see e.g., FIG. 13) and, after the payload 108 has been positioned on the payload support 180 between the payload holding arms 184, the arms 184 may be rotated back to the payload holding position (see e.g., FIG. 14). In some embodiments, the payload holding arms 184 may be telescopically extended to move to the payload receiving position (see e.g., FIG. 12) and, after the payload 108 has been positioned on the payload support 180 between the payload holding arms 184, the arms 184 may be telescopically retracted to move to the payload holding position (see e.g., FIG. 14). In some embodiments, the payload holding arms 184 may be both rotated and telescopically extended to move to the payload receiving position (see e.g., FIG. 13), such as to accommodate a payload of a greater width. After the payload 108 has been positioned on the payload support 180 between the payload holding arms 184, the arms 184 may be rotated back to the payload holding position and, depending on the width of the payload 108, telescopically retracted (see e.g., FIG. 14).

Optionally, each payload holding arm 184 can be lockable (e.g., by a latch, retractable pin, or other locking means) in one or both of the payload holding position and the payload receiving position.

Figure 12:
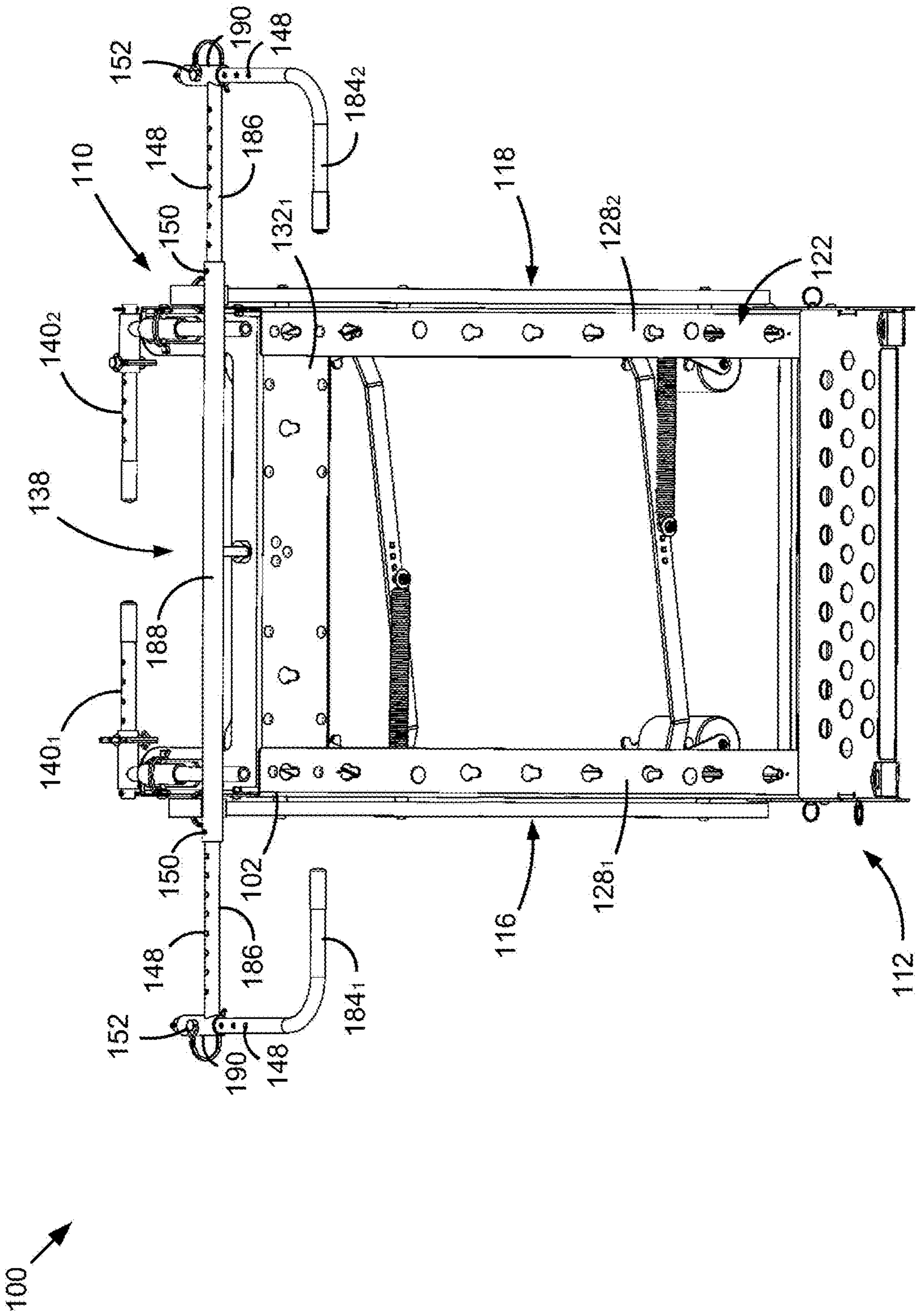
FIG. 12 is a front perspective view of the ladder trolley of FIG. 1 with payload holding arms in a payload receiving position.
Figure 13:
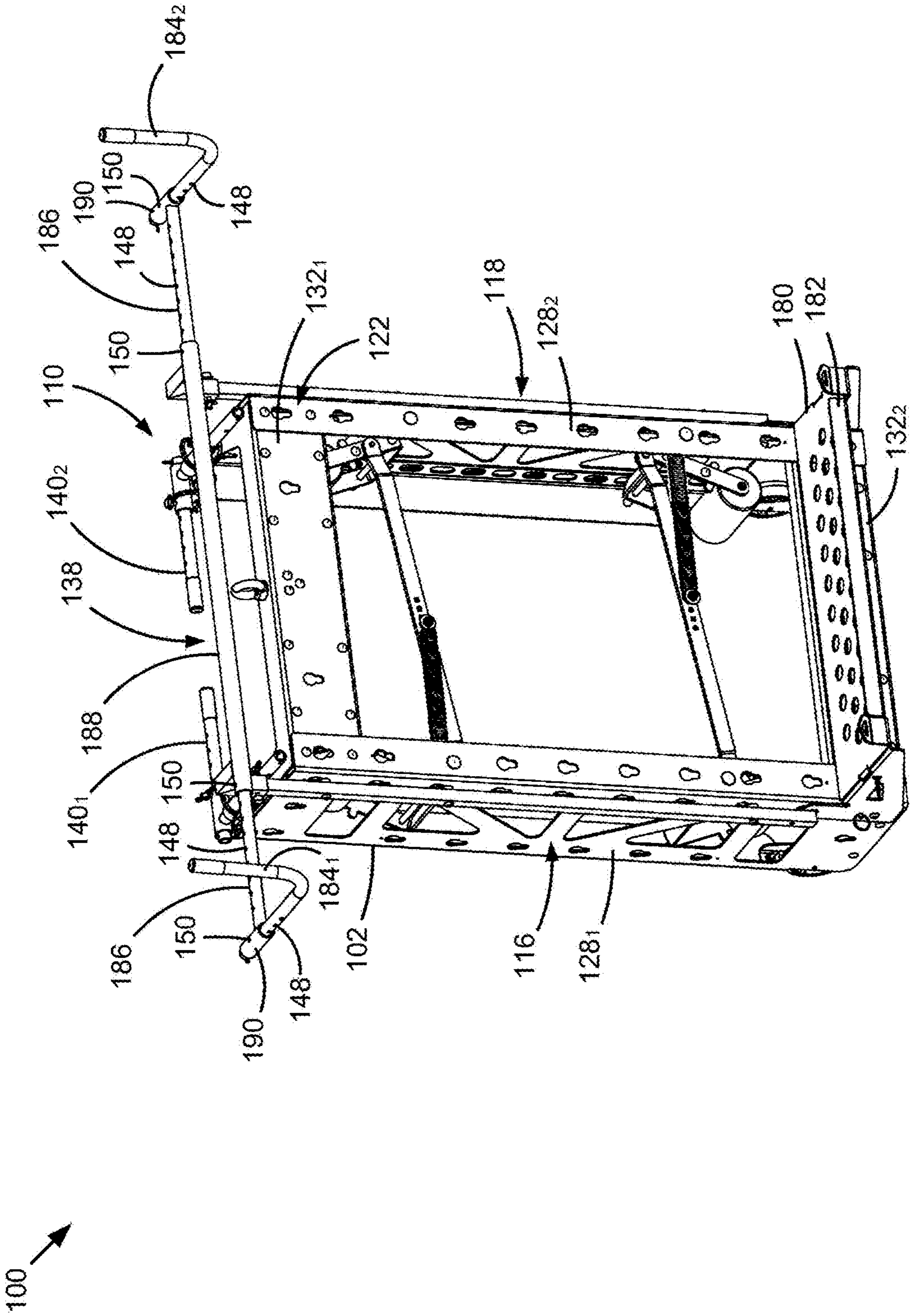
FIG. 13 is a front perspective view of the ladder trolley of FIG. 1 with the payload holding arm in another payload receiving position.

Referring to FIGS. 6, 12, and 13, the ladder trolley 100 includes a first payload holding arm $\mathbf{184_1}$ connected to the trolley frame 102 at the first side 116 and a second payload holding arm $\mathbf{184_2}$ connected to the trolley frame 102 at the second side 118. In the illustrated example, each of the first and second payload holding arms 184 are connected to the trolley frame 102 by a respective telescopic rod 186. The telescopic rods 186 are slidably received in a telescopic rod sleeve 188 at the upper end 110 of the trolley frame 102. The telescopic rods 186 include payload arms sleeves 190, which are coupled at one end of the telescopic rods 186, and through which the payload holding arms 184 are slidably received.

Each of the payload holding arms 184 and the telescopic rod 186 include a plurality of bores 148 spaced apart along its length and the telescopic rod sleeve 188 and payload arm sleeves 190 include a pair of opposed apertures 150. The telescopic rods 186 and the payload holding arms 184 can be coupled to, and moveable within, the telescopic rod sleeve 188 and payload arm sleeves 190 as described previously with respect to the ladder holding arms 140 (i.e., by aligning the apertures 150 with the desired bores 148 and inserting a cotter pin 152 therethrough). An advantage of this design is that is provides the ladder holding arms 140 with 4 degrees of freedom, enabling a range of adjustability. That is, in the illustrated example, in first and second degrees of freedom, the telescopic rods 186, and thereby the payload holding arms 184 coupled thereto, are rotatable about a longitudinal rod sleeve axis 192 of the telescopic rod sleeve 188 and laterally translatable along the rod sleeve axis 192. In third and fourth degrees of freedom, the payload holding arms 184 are rotatable about a payload arm sleeve axis 194 of the payload arm sleeves 190 and translatable in the depth direction along the payload arm sleeve axis 194.

In the illustrated example, the first and second payload holding arms 184 are also removable, providing another means to move between the payload holding position and the payload receiving position. As shown, the payload holding arms 184 can be withdrawn from the payload arm sleeves 190 when the cotter pins 152 coupling the payload holding arms 184 to the payload arm sleeves 190 are removed and when optional additional cotter pins 152 provided at the end of the payload holding arms 184 are also removed.

Optionally, the ladder trolley 100 can further include two or more ground engaging wheels rotatably connected to the trolley frame 102 proximate the lower end 112. For example, in the example illustrated in FIG. 2, the ladder trolley 100 includes a pair of laterally spaced apart ground engaging wheels 196 rotatably connected to the first and second side flanges 128 proximate the back side 124 at the lower end 112 of the trolley frame 102.

Where the ladder trolley 100 includes ground engaging wheels 196, the ladder trolley 100 can be used as a hand truck for ground transportation of the payload 108 or any other loads (e.g., materials, tools, etc.). To facilitate use as a hand truck, the payload holding arm(s) 184 and/or ladder holding arm(s) 140 can be used as a handle to push/pull the ladder trolley 100. For example, the payload 108 can be loaded onto the ladder trolley 100 at a loading location and transported by pulling the ladder trolley 100, supported on the ground by the ground engaging wheels 196, to the ladder 106 at a hoisting location. At the hoisting location, the payload 108 may then be unloaded from the ladder trolley 100 before positioning the trolley frame 102 around the ladder 106 and subsequently reloaded onto the ladder trolley 100. Alternately, the trolley frame 102 may be positioned around the ladder 106 while the payload 108 remains on the ladder trolley 100. This may depend on the size and/or weight of the payload 108.

To hoist the ladder trolley 100 up (and lower the ladder trolley 100 down) the ladder 106, any suitable hoisting means can be used such as a pulley system, manual hoist or winch, powered hoist or winch, and the like. In use, a rope or cable of the hoisting means can be connected to the trolley frame 102 at any suitable location(s) to then pull the ladder trolley 102 and payload 108 up the ladder 106. For example, in the example shown in FIG. 2, the ladder trolley 100 includes an anchor hook 198 (shown as an eyebolt) provided at the upper end 110 of the trolley frame 102. As shown, the anchor hook 198 extends from the upper webbing 132$_1$. It will be appreciated that, due to the previously described self-correcting effect of the pair(s) of ladder side rollers 104, a single centrally located anchor hook 196 may be used as shown in FIG. 2. However, more than one anchor hook may be used (e.g., two anchor hooks laterally spaced apart and provided at the upper end of the trolley frame proximate the first and second sides), which may provide additional stability to the ladder trolley 100 during hoisting operations.

Optionally, the ladder 106 may be supported proximate an upper end thereof by a standoff. The standoff may extend from the ladder 106 to the level (e.g., roof, floor, etc.) to/from which the ladder trolley 100 is to be transported. The standoff may support the ladder 106 at a distance spaced apart from that level (i.e., such that the ladder 106 does not contact an edge of the roof, gutter, floor, etc.). In this way, the ladder trolley 100 may pass that level unimpeded by the edge thereof. This may enable the ladder trolley 100 to be raised to a position above that level, which may facilitate easier loading/unloading of the payload 108 onto/off of the ladder trolley 100 at that level.

Optionally, where the ladder 106 is an extension ladder, an extension bridge (e.g., a clip-on ramp) may be positioned at the interface of a lower ladder section and an upper ladder section. This may enable the ladder trolley 100 to smoothly transition across the interface when travelling up/down the ladder 106.

In accordance with another aspect of this disclosure, there is provided a method of lifting a payload up a ladder using a ladder trolley 100. The method includes placing a payload 108 onto a payload support 180 of the ladder trolley 100. Optionally, the payload 108 can be placed onto the payload support 180 of the ladder trolley 100 at a loading location, and the method can further include transporting the payload 108 to the ladder 106 at a hoisting location by rolling the ladder trolley 100 on at least two ground engaging wheels 196 from the loading location to the hoisting location.

In some embodiments, the method can further include, before placing the payload 108 on the payload support 180, moving at least one payload holding arm 184 of the ladder trolley 100 to a payload receiving position (see e.g., FIG. 13) and, after placing the payload 108 on the payload support 180, securing the payload 108 to the ladder trolley 100 by moving the at least one payload holding arm 184 to a payload holding position (see e.g., FIG. 14).

The method can further include positioning the ladder trolley 100 around the ladder 106 having a first longitudinally extending ladder rail 159$_1$ and a second longitudinally extending ladder rail 159$_2$ (see e.g., FIG. 14). Optionally, placing the payload 108 on the payload support 180 can be performed after positioning the ladder trolley 100 around the ladder 106. Optionally, where the payload 108 has been transported from the loading location to the hoisting location, the payload 108 can be removed from the ladder trolley 100 before positioning the ladder trolley 100 around the ladder 106 and, after the ladder trolley 100 is positioned around the ladder 106, the payload 108 can again be placed on the payload support 180.

Figure 10:
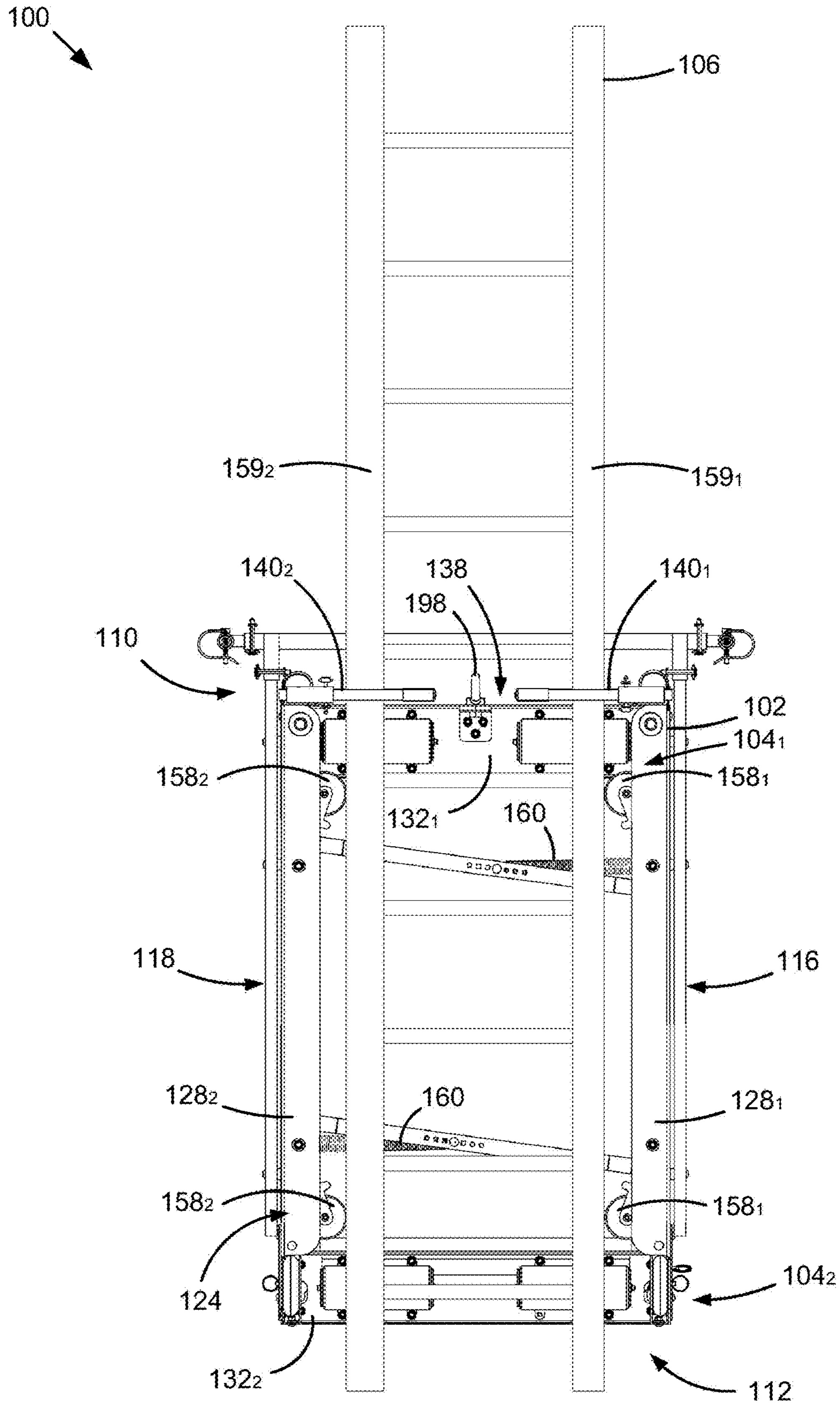
FIG. 10 is a rear view of the ladder trolley of FIG. 1 secured to the ladder.

The method can further include engaging the ladder 106 with at least one pair of laterally opposed ladder side rollers 104 of the ladder trolley 100 (see e.g., FIG. 10). Engaging the ladder with each pair of ladder side rollers 104 can include laterally resiliently biasing a first ladder side roller 158$_1$ from the ladder trolley 100 into contact with the first ladder rail 159$_1$ and laterally resiliently biasing a second ladder side roller 158$_2$ from the ladder trolley 100 into contact with the second ladder rail 159$_2$. Optionally, engaging the ladder 106 with each pair of ladder side rollers 104 can further include adjusting a biasing force $F_{SP}$ of a resilient bias 160 laterally resiliently biasing the first and second ladder side rollers 158 from the ladder trolley 100 into contact with the first and second ladder rails 159.

In some embodiments, the method can further include, before positioning the ladder trolley 100 around the ladder 106, laterally moving the first and second ladder side rollers 158 of each pair of ladder side rollers 104 laterally outwardly away from each other. Optionally, moving the first and second ladder side rollers 158 of each pair of ladder side rollers 104 away from each other can include removing the biasing force $F_{SP}$ of the resilient bias 160 or (see e.g., FIGS. 8 and 9), alternatively, manually overcoming the biasing force $F_{SP}$ (see e.g., FIGS. 15A and 15B).

In some embodiments, the method can further include, before positioning the ladder trolley 100 around the ladder 106, moving at least one ladder holding arm 140 of the ladder trolley 100 to a ladder receiving position (see e.g., FIG. 7) and, after positioning the ladder trolley 100 around the ladder 106, securing the ladder trolley 100 to the ladder 106 by moving the at least one ladder holding arm 140 to a ladder holding position (see e.g., FIG. 10).

In some embodiments, the method can further include hoisting the ladder trolley 100 up the ladder 106 with the ladder trolley 100 carrying the payload 108 wherein, during hoisting, the first and second ladder side rollers 158 of each pair 104 roll along the first and second ladder rails 159. In some embodiments, before hoisting the ladder trolley 100 up the ladder 106, the method can further include connecting a cable of a hoisting means to an anchor hook 198 of the ladder trolley 100 and, subsequently, hoisting the ladder trolley 100 with the payload 108 up the ladder 108 using the hoisting means.

In some embodiments, the method can further include engaging the first and second ladder rails 159 with at least one ladder front roller 134 of the ladder trolley 100 by positioning each ladder front roller 134 in contact with at least one of the first and second ladder rails 159. Optionally, engaging the first and second ladder rails 159 with the at least one ladder front roller 134 can be performed concurrently with positioning the ladder trolley 100 around the ladder 106.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1. A ladder trolley comprising:
- a trolley frame having an upper end longitudinally spaced apart from a lower end, the trolley frame having
  - longitudinally extending first and second side flanges, the first side flange being laterally spaced apart from the second side flange;
  - webbing connecting the first and second side flanges; and
  - a ladder travel channel extending from the upper end to the lower end, the ladder travel channel defined by at least the first side flange, the second side flange, and the webbing, the ladder travel channel being open at the upper and lower ends;
- at least one pair of ladder side rollers moveably connected to the trolley frame, each pair of ladder side rollers having
  - a first ladder side roller and a second ladder side roller, the first and second ladder side rollers being laterally moveable and resiliently biased laterally into the channel; and
- a payload support connected to the trolley frame, the payload support exterior to the ladder travel channel.

Item 2. The ladder trolley of any preceding item wherein each pair of ladder side rollers further has a linkage assembly, the linkage assembly comprising:
- a first lever arm and a second lever arm, the first lever arm pivotably connecting the first ladder side roller to the trolley frame and the second lever arm pivotably connecting the second ladder side roller to the trolley frame, each lever arm rotatable about a respective pivot.

Item 3. The ladder trolley of any preceding item wherein the linkage assembly of each pair of ladder side rollers further comprises:
- a central link having a first link end and a second link end, the first link end connected to the first lever arm at a first longitudinal position and the second link end connected to the second lever arm at a second longitudinal position longitudinally spaced apart from the first longitudinal position, wherein each pivot is provided at a third longitudinal position intermediate the first and second longitudinal positions.

Item 4. The ladder trolley of any preceding item wherein each pair of ladder side rollers further comprises a resilient bias, the resilient bias having:
- a first bias end connected to the central link and a second bias end connected to the trolley frame, whereby the first and second side ladder rollers are resiliently biased laterally into the channel.

Item 5. The ladder trolley of any preceding item wherein the first ladder side roller is moveably connected to the first side flange and the second ladder side roller is moveably connected to the second side flange, the first and second ladder side rollers being resiliently biased laterally toward each other.

Item 6. The ladder trolley of any preceding item wherein at least one of the first and second bias ends is removably connectable.

Item 7. The ladder trolley of any preceding item wherein the at least one pair of ladder side rollers comprises a first pair of ladder side rollers and a second pair of ladder side rollers, the first pair of ladder side rollers moveably connected to the trolley frame proximate the upper end and the second pair of ladder side rollers moveably connected to the trolley frame proximate the lower end.

Item 8. The ladder trolley of any preceding item further comprising at least one ladder front roller, each ladder front roller being connected to the trolley frame within the channel.

Item 9. The ladder trolley of any preceding item wherein the at least one ladder front roller comprises an upper ladder front roller and a lower ladder front roller, the upper ladder front roller connected to the trolley frame proximate the upper end and the lower ladder front roller connected to the trolley frame proximate the lower end.

Item 10. The ladder trolley of any preceding item wherein the at least one ladder front roller comprises at least one pair of ladder front rollers, each pair of ladder front rollers having a first ladder front roller and a second ladder front roller, the first ladder front roller being laterally spaced apart from the second ladder front roller.

Item 11. The ladder trolley of any preceding item wherein the at least one pair of ladder front rollers comprises an upper pair of ladder front rollers and a lower pair of ladder front rollers, the upper pair of ladder front rollers connected to the trolley frame proximate the upper end and the lower pair of ladder front rollers connected to the trolley frame proximate the lower end.

Item 12. The ladder trolley of any preceding item wherein each ladder front roller is connected to the webbing within the channel.

Item 13. The ladder trolley of any preceding item further comprising an anchor hook provided at the upper end of the trolley frame.

Item 14. The ladder trolley of any preceding item further comprising a pair of ground engaging wheels rotatably connected to the trolley frame proximate the lower end.

Item 15. The ladder trolley of any preceding item further comprising at least one payload holding arm moveably connected to the trolley frame.

Item 16. The ladder trolley of any preceding item wherein the at least one payload holding arm is movable between a payload receiving position, in which a payload is positionable on the payload support, and a payload holding position.

Item 17. The ladder trolley of any preceding item further comprising at least one ladder holding arm movably connected the trolley frame, each ladder holding arm movable between a ladder receiving position, in which the channel is open, and a ladder holding position.

Item 18. The ladder trolley of any preceding item wherein each ladder holding arm is movably connected to one of the first and second side flanges, each holding arm spaced apart from the webbing by the first or second side flange.

Item 19. The ladder trolley of any preceding item wherein, when the at least one ladder holding arm is in the ladder receiving position, the ladder travel channel is defined by the first side flange, the second side flange, and the webbing and, when the at least one ladder holding arm is in the ladder holding position, the ladder travel channel is defined by the first side flange, the second side flange, the webbing, and the at least one ladder holding arm.

Item 20. A method of lifting a payload up a ladder, the method comprising:

placing a payload onto a payload support of a ladder trolley;

positioning the ladder trolley around a ladder having a first longitudinally extending ladder rail and a second longitudinally extending ladder rail; and engaging the ladder with at least one pair of laterally opposed ladder side rollers of the ladder trolley by laterally resiliently biasing a first ladder side roller of each pair of ladder side rollers from the ladder trolley into contact with the first ladder rail; and laterally resiliently biasing a second ladder side roller of each pair of ladder side rollers from the ladder trolley into contact with the second ladder rail.

Item 21. The method of any preceding item wherein placing the payload on the payload support is performed after positioning the ladder trolley around the ladder.

Item 22. The method of any preceding item further comprising:

before positioning the ladder trolley around the ladder, moving at least one ladder holding arm of the ladder trolley to a ladder receiving position; and after positioning the ladder trolley around the ladder, securing the ladder trolley to the ladder by moving the at least one ladder holding arm to a ladder holding position.

Item 23. The method of any preceding item further comprising hoisting the ladder trolley up the ladder, the ladder trolley carrying the payload, the first and second ladder side rollers of each pair rolling up the first and second ladder rails.

Item 24. The method of any preceding item further comprising, before hoisting the ladder trolley up the ladder, connecting a cable of a hoist to an anchor hook of the ladder trolley.

Item 25. The method of any preceding item further comprising engaging the first and second ladder rails with at least one ladder front roller of the ladder trolley by positioning each ladder front roller in contact with at least one of the first and second ladder rails.

Item 26. The method of any preceding item further comprising, before positioning the ladder trolley around the ladder, laterally moving the first and second ladder side rollers of each pair of ladder side rollers away from each other.

The invention claimed is:

1. A ladder trolley comprising:

a trolley frame having an upper end longitudinally spaced apart from a lower end, the trolley frame having longitudinally extending first and second side flanges, the first side flange being laterally spaced apart from the second side flange;

webbing connecting the first and second side flanges; and a ladder travel channel extending from the upper end to the lower end, the ladder travel channel defined by at least the first side flange, the second side flange, and the webbing, the ladder travel channel being open at the upper and lower ends;

at least one pair of ladder side rollers moveably connected to the trolley frame, each pair of ladder side rollers having a first ladder side roller and a second ladder side roller, the first and second ladder side rollers being laterally moveable and resiliently biased laterally into the channel; and a payload support connected to the trolley frame, the payload support exterior to the ladder travel channel;

wherein each pair of ladder side rollers further comprises a linkage assembly, the linkage assembly comprising:

a first lever arm and a second lever arm, the first lever arm pivotably connecting the first ladder side roller to the trolley frame and the second lever arm pivotably connecting the second ladder side roller to the trolley frame, each lever arm rotatable about a respective pivot, and wherein the linkage assembly of each pair of ladder side rollers further comprises:

a central link having a first link end and a second link end, the first link end connected to the first lever arm at a first longitudinal position and the second link end connected to the second lever arm at a second longitudinal position longitudinally spaced apart from the first longitudinal position, wherein each pivot is provided at a third longitudinal position intermediate the first and second longitudinal positions.

2. The ladder trolley of claim 1 wherein each pair of ladder side rollers further comprises a resilient bias, the resilient bias having:

a first bias end connected to the central link and a second bias end connected to the trolley frame, whereby the first and second side ladder rollers are resiliently biased laterally into the channel.

3. The ladder trolley of claim 2 wherein at least one of the first and second bias ends is removably connectable.

4. The ladder trolley of claim 1 wherein the first ladder side roller is moveably connected to the first side flange and the second ladder side roller is moveably connected to the second side flange, the first and second ladder side rollers being resiliently biased laterally toward each other.

5. The ladder trolley of claim 1 wherein the at least one pair of ladder side rollers comprises a first pair of ladder side rollers and a second pair of ladder side rollers, the first pair of ladder side rollers moveably connected to the trolley frame proximate the upper end and the second pair of ladder side rollers moveably connected to the trolley frame proximate the lower end.

6. The ladder trolley of claim 1 further comprising at least one ladder front roller, each ladder front roller being connected to the trolley frame within the channel.

7. The ladder trolley of claim 6 wherein the at least one ladder front roller comprises an upper ladder front roller and a lower ladder front roller, the upper ladder front roller connected to the trolley frame proximate the upper end and the lower ladder front roller connected to the trolley frame proximate the lower end.

8. The ladder trolley of claim 6 wherein the at least one ladder front roller comprises at least one pair of ladder front rollers, each pair of ladder front rollers having a first ladder front roller and a second ladder front roller, the first ladder front roller being laterally spaced apart from the second ladder front roller.

9. The ladder trolley of claim 8 wherein the at least one pair of ladder front rollers comprises an upper pair of ladder front rollers and a lower pair of ladder front rollers, the upper pair of ladder front rollers connected to the trolley frame proximate the upper end and the lower pair of ladder front rollers connected to the trolley frame proximate the lower end.

10. The ladder trolley of claim 6 wherein each ladder front roller is connected to the webbing within the channel.

11. The ladder trolley of claim 1 further comprising an anchor hook provided at the upper end of the trolley frame.

* * * * *